(12) United States Patent
Adams et al.

(10) Patent No.: US 7,499,176 B2
(45) Date of Patent: *Mar. 3, 2009

(54) APPARATUS AND METHOD FOR USING A COUNTER-PROPAGATING SIGNAL METHOD FOR LOCATING EVENTS

(75) Inventors: Alexander Raoul Adams, Murrumbeena (AU); Jim Katsifolis, Northcote (AU)

(73) Assignee: Future Fibre Technologies Pty Ltd, Mulgrave VIC (AU)

(*) Notice: Subject to any disclaimer, the term of this patent is extended or adjusted under 35 U.S.C. 154(b) by 138 days.

This patent is subject to a terminal disclaimer.

(21) Appl. No.: 11/674,438

(22) Filed: Feb. 13, 2007

(65) Prior Publication Data

US 2008/0191126 A1 Aug. 14, 2008

(51) Int. Cl.
*G01B 9/02* (2006.01)
*G02B 6/00* (2006.01)

(52) U.S. Cl. .................. 356/483; 356/493; 385/12
(58) Field of Classification Search ........... 356/483, 356/491, 493; 385/12
See application file for complete search history.

(56) References Cited

U.S. PATENT DOCUMENTS

| | | | |
|---|---|---|---|
| 4,848,906 A | 7/1989 | Layton | |
| 4,885,462 A * | 12/1989 | Dakin | 356/28.5 |
| 4,897,543 A | 1/1990 | Kersey | |
| 4,898,468 A * | 2/1990 | Udd | 356/483 |
| 4,915,503 A | 4/1990 | Pavlath | |
| 4,976,507 A * | 12/1990 | Udd | 385/12 |
| 5,046,848 A * | 9/1991 | Udd | 356/483 |
| 5,206,923 A | 4/1993 | Karlsson | |
| 5,311,592 A * | 5/1994 | Udd | 398/42 |
| 5,402,231 A * | 3/1995 | Udd | 356/483 |
| 5,455,698 A * | 10/1995 | Udd | 398/79 |
| 5,473,459 A | 12/1995 | Davis | |
| 5,636,021 A * | 6/1997 | Udd | 356/483 |
| 5,694,114 A * | 12/1997 | Udd | 340/506 |
| 6,490,045 B1 * | 12/2002 | Dakin et al. | 356/483 |

(Continued)

FOREIGN PATENT DOCUMENTS

FR 2753530 3/1998

(Continued)

OTHER PUBLICATIONS

Chapters 8-11 from Eric Udd, "Fiber Optic Sensors: An Introduction for Engineers and Scientists", 1991, John Wiley and Sons, ISBN 0-471-83007-0.

(Continued)

*Primary Examiner*—Patrick J Connolly
(74) *Attorney, Agent, or Firm*—Michael Best & Friedrich LLP

(57) ABSTRACT

An apparatus and method for using a counter-propagating signal method for locating events is disclosed. The apparatus and method uses a Mach Zehnder interferometer through which counter-propagating signals can be launched. If the sensing zone of the Mach Zehnder interferometer is disturbed, modified counter-propagating signals are produced and the time difference between receipt of those signals is used to determine the location of the event. A microcontroller receives feedback signals which adjusts polarisation controllers so that the polarisation states of the counter-propagating signals can be controlled to match the amplitude and/or phase of the output signals. Detectors are provided for detecting the modified signals.

26 Claims, 12 Drawing Sheets

U.S. PATENT DOCUMENTS

| | | |
|---|---|---|
| 6,600,586 B1 | 7/2003 | Hall |
| 6,621,947 B1 * | 9/2003 | Tapanes et al. ............... 385/12 |
| 6,778,717 B2 * | 8/2004 | Tapanes et al. ............... 385/12 |
| 2005/0147341 A1 * | 7/2005 | Patel et al. ............... 385/12 |
| 2005/0276611 A1 | 12/2005 | Patel et al. |

FOREIGN PATENT DOCUMENTS

| | | |
|---|---|---|
| GB | 1497995 | 1/1978 |
| GB | 2204204 | 11/1988 |
| JP | 10148654 | 6/1998 |
| JP | 10160635 | 6/1998 |
| JP | 2000048269 | 2/2000 |

OTHER PUBLICATIONS

Kersey A. D., Marrone M. J., Dandridge A., and Tveten A. B., "Optimization and Stabilization of Visibility in Interferometric Fiber-Optic Sensors Using Input Polarization Control", Journal of Lightwave Technology, vol. 16, No. 10, Oct. 1988, pp. 1599-1609.

Declaration of Jim Katsifolis, Ph.D.

PCT search report PCT/AU2005/001899 for international publication WO 2006/074502.

* cited by examiner

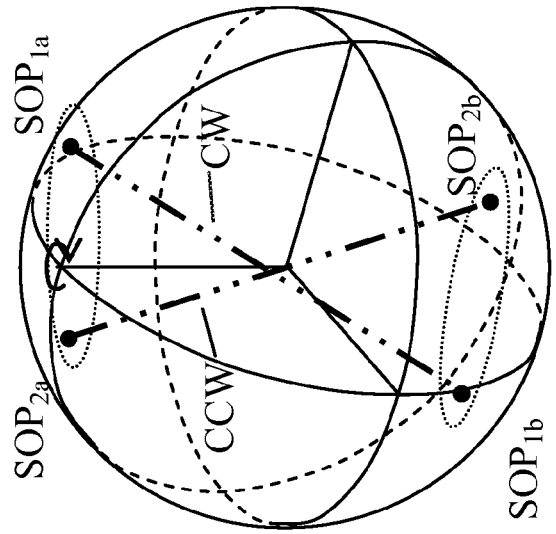
FIG. 5
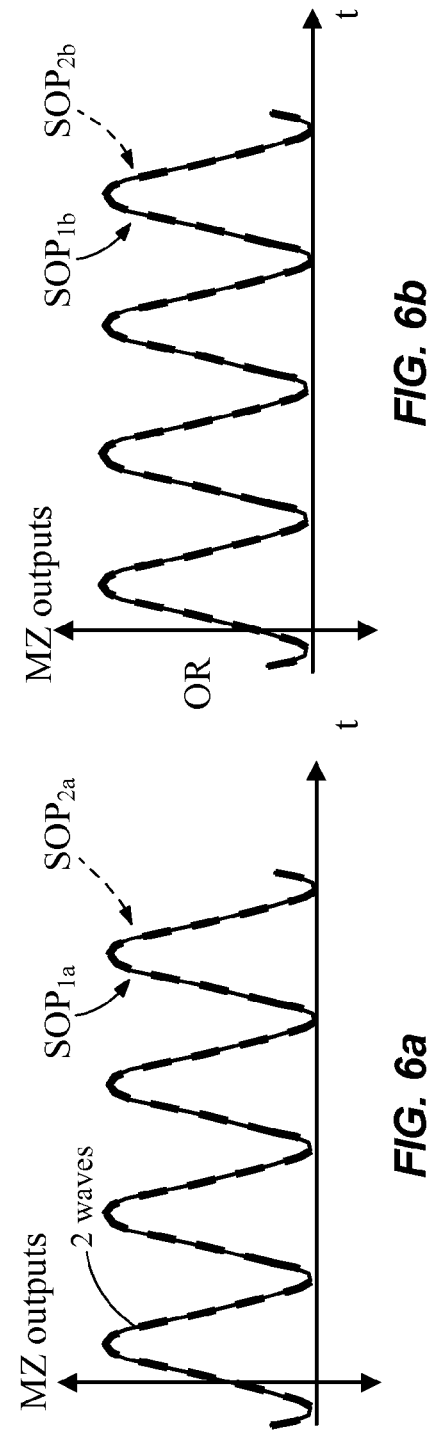
FIG. 6b
FIG. 6a

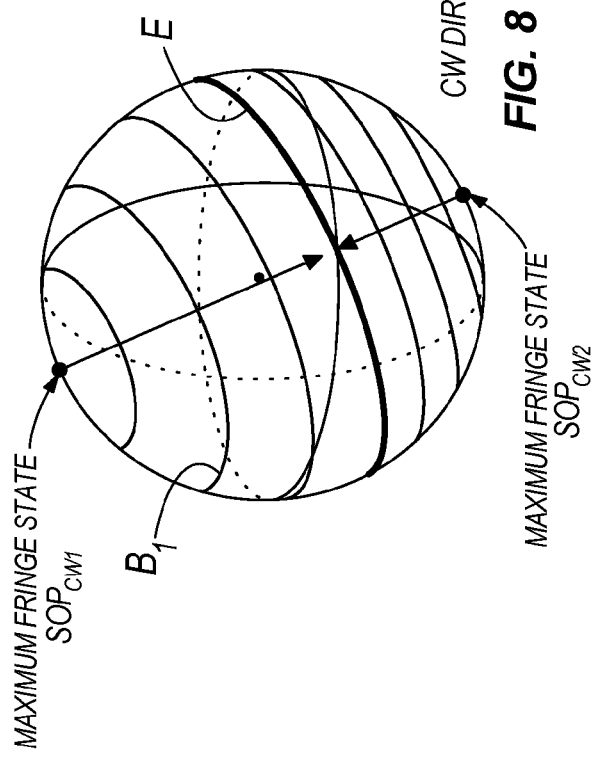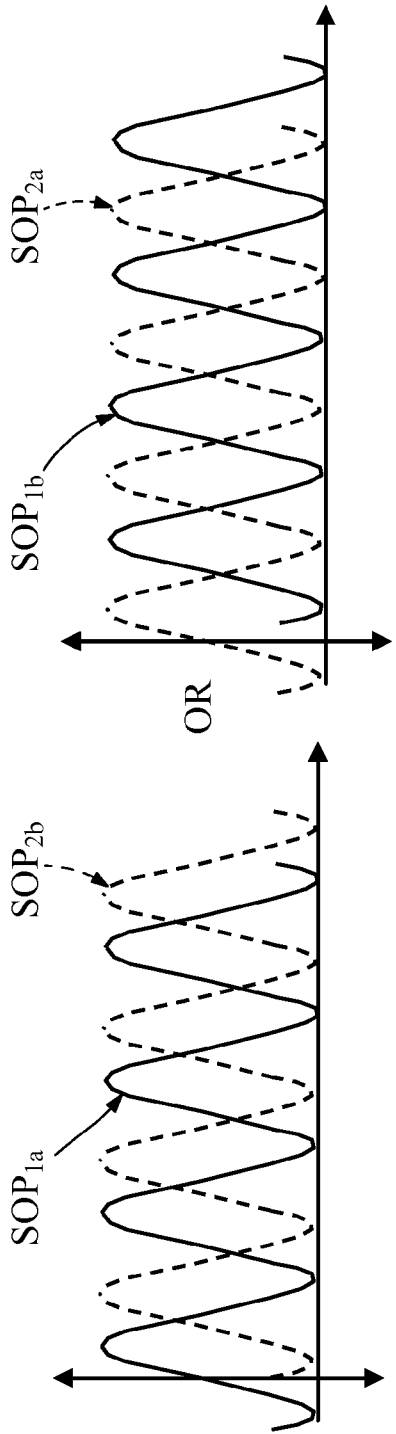

APPARATUS AND METHOD FOR USING A COUNTER-PROPAGATING SIGNAL METHOD FOR LOCATING EVENTS

FIELD OF THE INVENTION

This invention relates to a method and apparatus for locating events, such as intrusions into secured premises, or breakdown or other events associated with structures, so that the location of the event can be determined.

BACKGROUND OF THE INVENTION

Apparatus and method for locating events are disclosed in our U.S. Pat. Nos. 6,621,947 and 6,778,717, and U.S. application Ser. No. 11/311,009. The contents of these two patents and the application are incorporated into this specification by this reference.

The system used in the above-identified US patents utilises a bi-directional Mach Zehnder (MZ) interferometer in which counter-propagating signals are provided. By measuring the time difference of perturbed signals caused by an event, the location of the event along the sensing device formed by the Mach Zehnder interferometer can be determined.

Thus, when an event perturbs the MZ sensor portion of the system, the difference in the arrival time of the counter-propagating signals at the detectors can be used to calculate the exact location of the perturbation on the MZ sensor. This type of sensor can be applied to perimeter or infrastructure security applications, with typical sensing lengths exceeding 50 km.

The above US application specifically discloses improvements to the concept disclosed in the US patents by adjusting the input polarisation states to phase match the counter-propagating optical output signals. By matching the phase of the counter-propagating optical output signals, output fringes at the detectors are produced which are easily detected and therefore, the time difference between receipt of the two modified counter-propagating signals can be accurately recorded to more accurately determine the location of an event.

SUMMARY OF THE INVENTION

The invention provides an apparatus for locating the position of an event, comprising:
a light source;
a waveguide for receiving light from the light source so that the light is caused to propagate in both directions along the waveguide to thereby provide counter-propagating optical signals in the waveguide, the waveguide being capable of having the counter-propagating optical signals or some characteristic of the signals modified or affected by an external parameter caused by or indicative of the event to provide modified counter-propagating optical signals which continue to propagate along the waveguide;
wherein the waveguide comprises a first arm for receiving the counter-propagating signals, and a second arm for receiving the counter-propagating signals, the first and second arms forming a Mach Zehnder interferometer;
a detector for detecting the modified counter-propagating optical signals affected by the parameter and for determining the time difference between the receipt of the modified counter-propagating optical signals in order to determine the location of the event;
polarisation controllers for setting the polarisation states of the counter-propagating optical signals;
a main controller for controlling the polarization controllers so that the output signals are phase matched;
the main controller comprising:
(i) a fringe visibility monitor having:
(a) a circuit for determining a maximum and minimum value of each counter-propagating optical signal after the signals have passed along the first and second arms in one direction and recombined and interfered to create fringes, and after the signals have passed along the first and second arms in the opposite direction and recombined and interfered to produce fringes; and
(b) a circuit for determining the difference between the counter-propagating optical signals; and
(ii) a processor for determining fringe visibility of the fringes by (max-min)/(max+min) wherein max is the maximum value and min is the minimum value, the processor having a memory for storing polarisation states corresponding to each fringe visibility and determining those which provide maximum fringe visibilities, the processor also being for determining phase matching of the counter-propagating output signals by determining at least one pair of the stored polarisation states providing the maximum fringe visibilities and which correspond to a minimum difference between the counter-propagating optical output signals; and
the processor being for setting the polarisation controllers to the at least one pair of polarisation states.

Preferably the fringe visibility monitor is for continuously monitoring fringe visibility so that when maximum fringe visibility drops below a predetermined threshold, the processor again determines two pairs of polarisation states which provide maximum fringe visibility and phase matched output signals, and resets the polarisation controllers to the polarisation states corresponding to the at least one pair of polarisation states.

Preferably there is a path length mismatch between the first and second arms of the Mach Zehnder interferometer, further comprising a dither circuit for modulating or dithering the wavelength of the light produced from the light source, the dithering of the light source resulting in the creation of artificial fringes when the signals propagating in one direction through the first and second arms and the signals propagating in the opposite direction through the first and second arms respectively interfere, to provide the fringes from which the two pairs of polarisation states are determined.

Preferably the detector comprises a first detector for one of the counter-propagating signals and a second detector for the other of the counter-propagating signals.

Preferably the processor is also for receiving outputs from the detectors and for processing the outputs to indicate an event and to determine the location of the event.

Preferably the detectors are connected to a Mach Zehnder output monitor for monitoring the counter-propagating signals detected by the detectors so that when the modified counter-propagating signals are detected, outputs from the monitor are supplied to the processor to determine the location of the event.

Preferably the dither circuit dithers the phase difference between the MZ arms by at least 360°, to produce artificial fringes, so that the drifting output of the Mach Zehnder interferometer operating point always displays its true fringe visibility.

Preferably the processor is for determining at least two pairs of polarisation states and one pair of those two pairs of polarisation states are used to set the polarisation controllers.

The invention also provides a method of locating an event comprising the steps of:

- launching light into a waveguide so that the light is caused to propagate in both directions along the waveguide to thereby provide counter-propagating optical signals in the waveguide, the waveguide being capable of having the counter-propagating optical signals or some characteristic of the signals modified or affected by an external parameter caused by the event, to provide modified counter-propagating optical signals which continue to propagate along the waveguide;
- the waveguide being formed as a Mach Zehnder interferometer having a first arm through which the counter-propagating optical signals travel, and a second arm through which the counter-propagating optical signals travel;
- substantially continuously and simultaneously monitoring the modified counter-propagating optical signals, so that when an event occurs, both of the modified counter-propagating optical signals affected by the external parameter are detected;
- determining the time difference between the detection of the modified signals in order to determine the location of the event;
- controlling the polarisation states of the counter-propagating optical signals input into the waveguide to provide phase matched counter-propagating output signals from the waveguide by:
  (i) determining a maximum and minimum value of each counter-propagating optical signal;
  (ii) determining the difference between the values of the counter-propagating optical signals;
  (iii) determining fringe visibility by (max−min)/(max+min) where max is the maximum value and min is the minimum value;
  (iv) determining at least one pair of polarisation states which produce maximum fringe visibilities and minimum difference between the counter-propagating signals; and
  (v) controlling the polarisation states of the counter-propagating optical signals in accordance with the pair of polarisation states.

Preferably the method further comprises continuously monitoring fringe visibility so that when maximum fringe visibility drops below a predetermined threshold, again determining the two pairs of polarisation states and resetting the polarisation of the counter-propagating signals in accordance with those two pair of polarisation states.

Preferably the method further comprises dithering the wavelength of the light, the dithering of the light source resulting in the creation of artificial fringes when the signals propagating in one direction through the first and second arms interfere, and the signals propagating in the opposite direction through the first and second arms interfere, to provide the fringes from which the two pairs of polarisation states are determined.

Preferably the light wavelength is dithered by an amount which leads to the dithering of the phase difference between the MZ arms by 360°, to produce artificial fringes, so that with a drifting operating point, the Mach Zehnder's counter-propagating outputs always display their true fringe visibility.

Preferably at least two pairs of polarisation states are determined and the polarisation states of the counter-propagating optical signals are set to one pair of those two pairs of polarisation states.

The invention also provides an apparatus for locating the position of an event, comprising:

- a light source;
- a waveguide for receiving light from the light source so that the light is caused to propagate in both directions along the waveguide to thereby provide counter-propagating optical signals in the waveguide, the waveguide being capable of having the counter-propagating optical signals or some characteristic of the signals modified or affected by an external parameter caused by or indicative of the event to provide modified counter-propagating optical signals which continue to propagate along the waveguide;
- wherein the waveguide comprises a first arm for receiving the counter-propagating signals, and a second arm for receiving the counter-propagating signals, the first and second arms forming a Mach Zehnder interferometer;
- a detector for detecting the modified counter-propagating optical signals affected by the parameter and for determining the time difference between the receipt of the modified counter-propagating optical signals in order to determine the location of the event;
- a dither circuit for dithering the wavelength of the light produced by the light source to produce fringes when the counter-propagating signals recombine and interfere after passing through the arms of the Mach Zehnder interferometer;
- polarisation controllers for setting the polarisation states of the counter-propagating optical signals so that the counter-propagating output signals detected by the detector are phase matched;
- a main controller for controlling the polarisation controllers by monitoring fringe visibility of the fringes produced from the counter-propagating optical signals when the signals passing through the first and second arms recombine and interfere, and for determining, when the fringe visibility drops below a predetermined value, new polarisation states corresponding to maximum fringe visibilities and minimum difference between the counter-propagating signals, and for controlling the polarisation controllers to set the polarisation states of the counter-propagating optical signals in accordance with the new polarisation states.

Preferably the dither circuit continuously dithers the wavelength of the light at an electrical frequency outside the expected electrical frequency band caused by a detected perturbation, so that the dithering of the wavelength of the light does not interfere with detection of the perturbation.

Preferably the perturbation event has a frequency in the bandwidth from 1 kHz to 20 kHz and the apparatus includes a band pass filter for filtering outputs from the detectors to the bandwidth of from 1 kHz to 20 kHz for perturbation detection and location of the perturbation.

Preferably the wavelength band of the dithered wavelength of the light is produced by a dithering frequency above 50 kHz.

Preferably the main controller is for performing a global iterative search to initially select a plurality of random input polarisation states randomly distributed over the whole of a Poincare sphere to determine the initial polarisation states to which the polarisation controllers are set for providing maximum fringe visibility and phase matched counter-propagating output signals, and if fringe visibility drops below the predetermined value, a localised search around the previously set polarisation states is conducted to determine new polarisation states which provide maximum fringe visibility and phase-matching, and the main controller controls the polarisation controllers in accordance with those new polarisation states.

Preferably the main controller comprises a fringe visibility monitor for monitoring fringe visibilities of the fringes, the fringe visibility monitor having a circuit for determining a maximum or minimum value for each counter-propagating optical signal, and a circuit for determining the difference between the counter-propagating optical signals, a Mach Zehnder output monitor for determining receipt of the modified counter-propagating optical signals by detecting a change in the fringes caused by a perturbation, the fringe visibility monitor and the Mach Zehnder output monitor being connected to the detector, a processor connected to the fringe visibility monitor and the Mach Zehnder output monitor for determining the location of the event, and for controlling a polarisation controller driver to in turn control the polarisation controllers to set the polarisation states of the counter-propagating optical signals.

The invention also provides a method of locating an event comprising the steps of:

launching light into a waveguide so that the light is caused to propagate in both directions along the waveguide to thereby provide counter-propagating optical signals in the waveguide, the waveguide being capable of having the counter-propagating optical signals or some characteristic of the signals modified or affected by an external parameter caused by the event, to provide modified counter-propagating optical signals which continue to propagate along the waveguide;

the waveguide being formed as a Mach Zehnder interferometer having a first arm through which the counter-propagating optical signals travel, and a second arm through which the counter-propagating optical signals travel;

substantially continuously and simultaneously monitoring the modified counter-propagating optical signals, so that when an event occurs, both of the modified counter-propagating optical signals affected by the external parameter are detected;

determining the time difference between the detection of the modified signals in order to determine the location of the event;

controlling the polarisation states of the counter-propagating optical signals input into the waveguide to provide phase matched counter-propagating signals from the waveguide by detecting fringe visibilities of fringes created by the counter-propagating optical signals when the signals travelling through the first and second arms recombine and interfere by determining maximum fringe visibilities and minimum difference between the counter-propagating optical signals corresponding to those maximum fringe visibilities, and continuously monitoring the fringe visibilities so that if the fringe visibilities drop below a predetermined value, new polarisation states are determined, and controlling the polarisation of the counter-propagating optical signals to provide phase matched counter-propagating optical signals in accordance with the new polarisation states.

Preferably the wavelength of the light is continuously dithered at an electrical frequency outside the expected electrical frequency band caused by a detected perturbation, so that the dithering of the wavelength of the light does not interfere with detection of the perturbation.

Preferably the perturbation event has a frequency in the bandwidth from 1 kHz to 20 kHz and the method further comprises band pass filtering outputs from the detectors to the bandwidth of from 1 kHz to 20 kHz for perturbation detection and location of the perturbation.

Preferably the dithered wavelength of the light is produced by a dithering frequency above 50 kHz.

Preferably the method further comprises performing a global search to select a plurality of random input polarisation states randomly distributed over the whole of a Poincare sphere to determine the initial polarisation states to which the polarisation controllers are set for providing maximum fringe visibility and phase matched counter-propagating output signals, and if fringe visibility drops below the predetermined value, a localised search around the previously set polarisation states is conducted to determine new polarisation states which provide maximum fringe visibility and phase matching, and controlling the polarisation of the counter-propagating signals supplied to the Mach Zehnder interferometer in accordance with those new polarisation states.

Preferably the method further comprises monitoring fringe visibilities of the fringes, determining a maximum or minimum value for each counter-propagating optical signal, determining the difference between the counter-propagating optical signals, detecting the modified counter-propagating optical signals by detecting a change in the fringes caused by a perturbation.

BRIEF DESCRIPTION OF THE DRAWINGS

Preferred embodiments will be described, by way of example, with reference to the accompanying drawings, in which:

FIG. 5 is a Poincare sphere diagram relating to the embodiment of FIG. 4;

FIG. 6A and FIG. 6B are graphs showing phase matched maximum fringe visibility outputs according to the embodiment of FIG. 4;

FIG. 7A and FIG. 7B are illustrative diagrams showing non-phase matched maximum fringe outputs;

FIG. 8 is a Poincare sphere diagram illustrating various input polarisation states of one counter-propagating signal to provide various fringe visibilities according to embodiments of the invention;

DETAILED DESCRIPTION OF THE PREFERRED EMBODIMENTS

Figure 1:
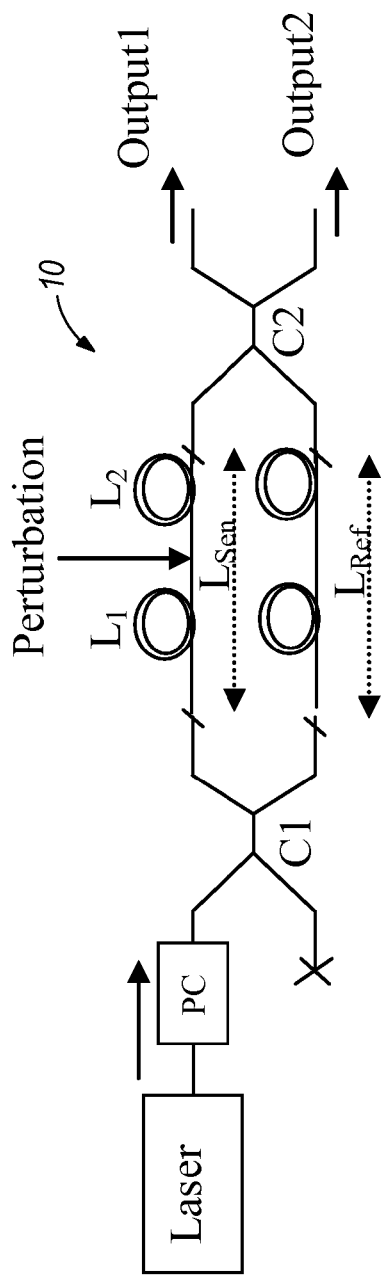
FIG. 1 is a diagram of a basic layout of a conventional uni-directional MZ system.
Figure 3:
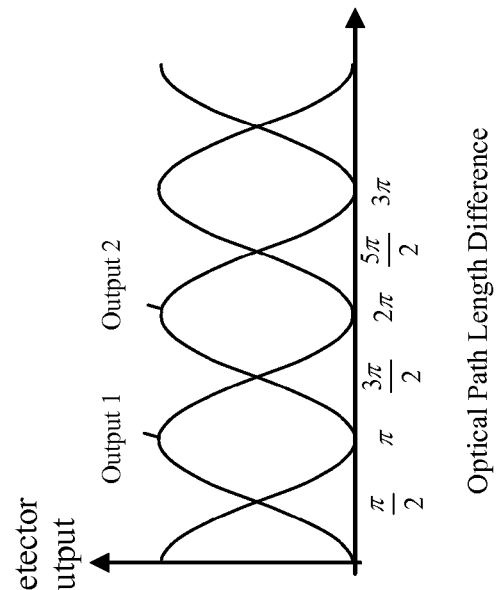
FIG. 3 is a diagram showing the outputs in FIG. 1 caused by the phase differences between the unidirectional MZ arms.

With reference to FIG. 1, both outputs of a conventional unidirectional Mach Zehnder interferometer 10 (MZ) (shown in FIG. 3), which are complementary, will drift and vary in an approximately sinusoidal fashion with time due to environmental and other effects. The maximum possible amplitude, or fringe visibility, of the intensity of both MZ outputs can be related to the alignment of the polarisation states of the interfering signals in the MZ interferometer arms. The optical fibre cables that make up an MZ system can be installed in a variety of environments where they will be subjected to fluctuating and random conditions such as wind, rain, mechanical vibrations, stress and strain, and temperature variations. These effects can vary the birefringence of the optical fibre in the cables, which in turn will affect the alignment of the interfering signals in the MZ arms, and change the fringe visibilities of the MZ outputs. This is known as the polarisation induced fringe fading (PIFF) effect. The PIFF effect also introduces a birefringence induced phase lag into the MZ outputs. So, in a realistic installation, where environmental factors will cause random birefringence changes along the fibres of the Locator system, the fringe visibilities of the respective MZ output intensities can vary randomly with time.

Figure 2:
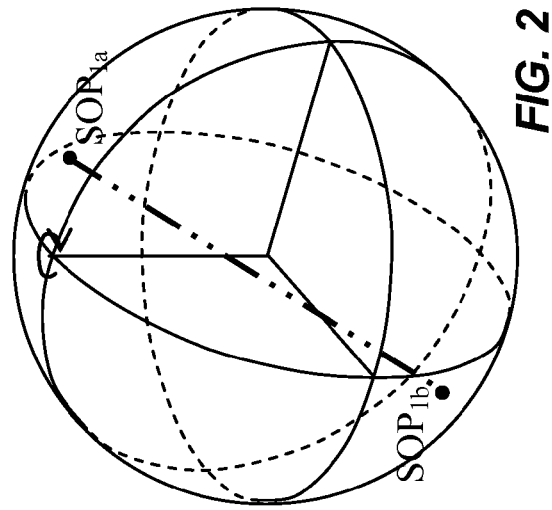
FIG. 2 is a Poincare sphere illustrating polarisation states which achieve maximum fringe visibility for a unidirectional MZ.

It is possible to control the alignment of polarisation states of the interfering signals, and therefore the fringe visibility of a MZ, by controlling the polarisation of the light signal in the input lead fibre. In fact, at any given time, there are two possible polarisation states at the input lead of the fibre MZ for which the fringe visibility of the outputs of a unidirectional MZ is at a maximum approaching unity. This is shown in FIG. 2 for a unidirectional MZ using a Poincare sphere to illustrate the two maximum fringe input polarisation states, $SOP_{1a}$ and $SOP_{1b}$.

Figure 4:
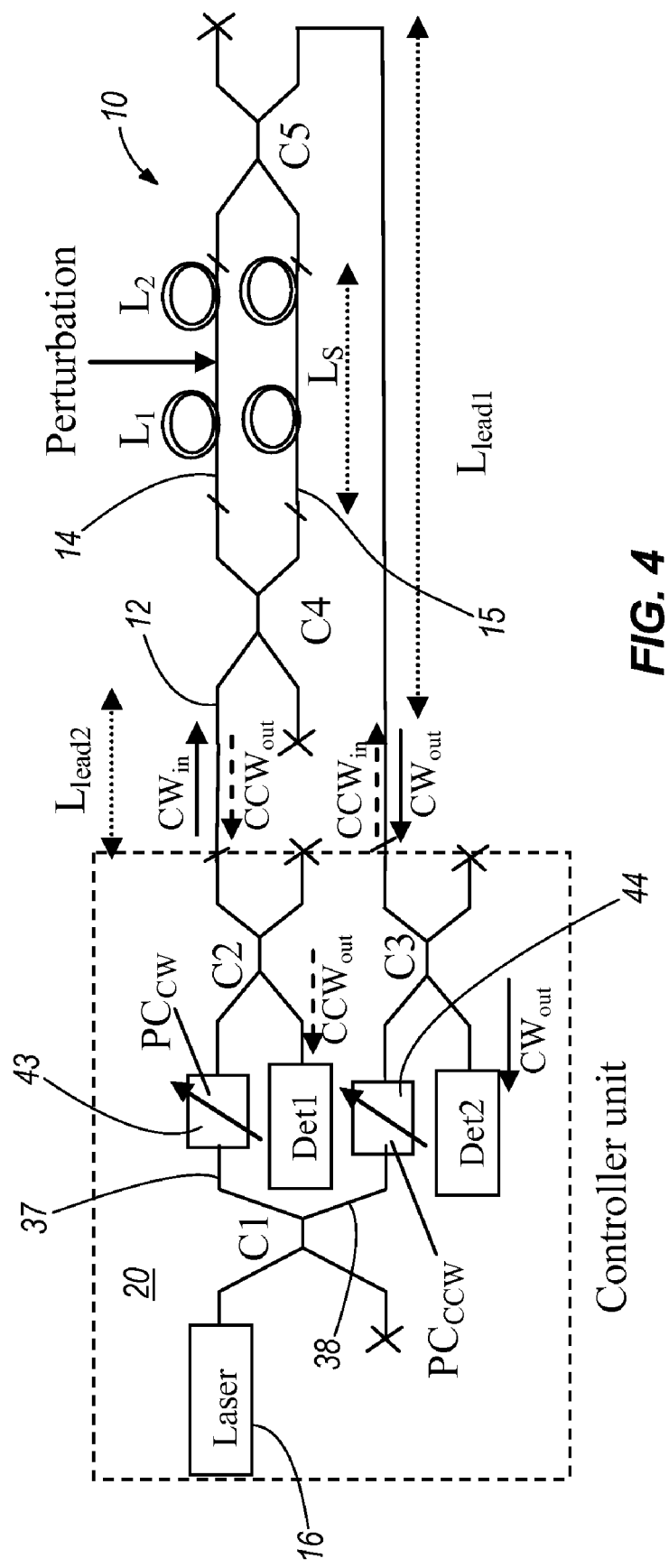
FIG. 4 is a diagram of a system according to preferred embodiments of the invention.

With reference to FIG. 4, the inventors have shown experimentally that the bidirectional MZ 10 can be treated as two separate unidirectional MZs, one for each direction of propagation. However, the two counter-propagating MZs are not completely independent, and do share an important polarisation related behaviour.

The counterpropagating outputs of the bi-directional MZ will also drift and vary in the same fashion. For each direction, there will also be two input polarisation states for which the MZ outputs will achieve a maximum output fringe. Although the choice of either one of these input polarisation states achieves a maximum output fringe, and thus a maximum sensitivity for a conventional MZ, in the case of a bi-directional MZ 10 used to locate events, the choice of input polarisation state for each direction carries an important significance. For this discussion, it will be assumed that only one MZ output for each direction is used (clockwise—$CW_{out}$ and counterclockwise—$CCW_{out}$).

For the CW propagation direction there are two possible input polarisation states which give maximum output fringes—$SOP_{1a}$ and $SOP_{1b}$. Equally, for the CCW propagation direction, the two possible input polarisation states which give maximum output fringes are $SOP_{2a}$ and $SOP_{2b}$.

Although there are 4 possible pairings which will simultaneously lead to maximum fringes at both Locator MZ outputs of the bidirectional MZ ($SOP_{1a}$ and $SOP_{2a}$, or $SOP_{1a}$ and $SOP_{2b}$, or $SOP_{1b}$ and $SOP_{2a}$, or $SOP_{1b}$ and $SOP_{2b}$), only two of these pairings will lead to the MZ outputs that have both maximum fringe visibility and are exactly matched in phase. This means that it is always possible to choose counterpropagating input polarisation states for the bidirectional MZ which always leads to maximum fringe and phase matched outputs when in the rest state (no disturbance on sensing arms 14 and 15).

The bi-directional MZ 10 shown in FIG. 4 includes a coupler C4 to incorporate a fibre lead-in length 12 to the MZ sensor, $L_{lead2}$. This is one practical way to set up the system as it allows for encapsulation of the optoelectronics and associated optical components in one controller unit 20. Also included are two polarisation controllers, $PC_{CW}$ 43 and $PC_{CCW}$ 44, which can be used to control the input polarisation state to the MZ 10 for the CW (clockwise) and CCW (counter-clockwise) directions, respectively. Controlling the input polarisation state in the lead fibre of a MZ can achieve maximum output fringes. This can be applied independently to both directions on the bi-directional MZ 10 in order to simultaneously achieve maximum output fringes for both directions. Various multiple-plate, voltage controlled polarisation controllers can be used to control the input polarisation state, and can include liquid crystal based polarisation controllers or piezo-based polarisation controllers.

For the CW propagation direction there are the two possible input polarisation states which give maximum output fringes—$SOP_{1a}$ and $SOP_{1b}$. Equally, for the CCW propagation direction, the two possible input polarisation states which give maximum output fringes are $SOP_{2a}$ and $SOP_{2b}$. These polarisation states can be represented on a Poincare sphere as shown in FIG. 5.

For the example shown in FIG. 4, the phase matched maximum fringe counter-propagating input polarisation states are: ($SOP_{1a}$ and $SOP_{2a}$), and ($SOP_{1b}$ and $SOP_{2b}$). This is shown in the FIGS. 6A and 6B.

FIGS. 6A and 6B show two waves which are completely overlapped, namely $SOP_{1a}$ and $SOP_{2a}$ in FIG. 6A, and $SOP_{1b}$ and $SOP_{2b}$ in FIG. 6B.

This phase and amplitude matching condition is important for the apparatus and method of the preferred embodiment, as it will allow for the most accurate location of events on the sensing cable to be determined. This means that it is essential that there is no time difference between the counter-propagating drifting MZ output signals when the MZ 10 is in the rest state (no disturbance). If the counter-propagating outputs are not matched in phase, then this will lead to the introduction of an error in the time difference calculation and thus the calculation of the location.

FIGS. 7A and 7B show the counter-propagating MZ outputs for the non phase matched maximum fringe counter-propagating input polarisation states, namely $SOP_{1a}$ and $SOP_{2b}$ in FIG. 7A, and $SOP_{1b}$ and $SOP_{2a}$ in FIG. 7B.

The achievement of counter-propagating, phase-matched maximum fringe outputs leads to two important results with respect to the system. It allows for accurate locating of events, as well as maximum sensitivity of the bi-directional MZ.

Input polarisation states which lead to amplitude and phase matched counter-propagating outputs are not limited only to the input polarisation states which achieve maximum output fringes. There is also a plurality of other input polarisation state pairs which also lead to amplitude and phase matched outputs, but with sub-maximum fringe visibilities. For example, it is possible to adjust both polarisation controllers 43 and 44 such that the fringe visibility of both outputs is identical and less than the theoretical maximum of 100%, but phase matched. Although a reduction in fringe visibility will lead to a reduction in sensitivity of the bidirectional MZ 10, as long as the fringe visibility is kept relatively high (for example >75%), it is still possible for the system to calculate accurate locations whilst maintaining an acceptable level of sensitivity. It is preferable however that the MZ is always operated at its maximum sensitivity.

Figure 9:
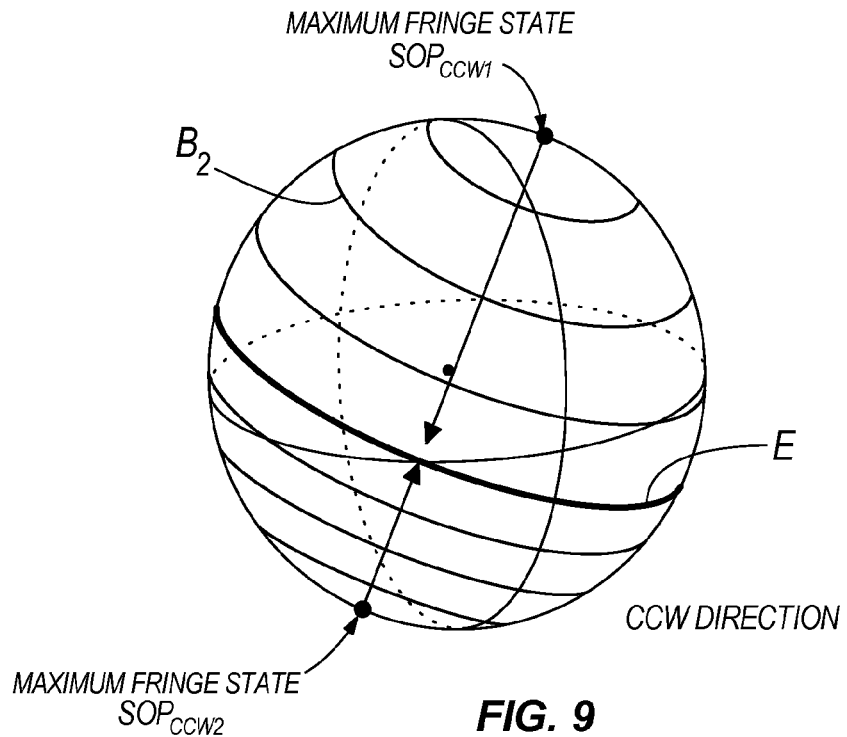
FIG. 9 is a diagram similar to FIG. 8 relating to the other counter-propagating signal.

The variation in fringe visibility of the MZ 10 output (i.e. from couplers C4 and C5) for each direction in the bi-directional MZ can be plotted on a Poincare sphere to show the relationship between input polarisation states and MZ output fringe visibility. A typical response is shown in FIGS. 8 and 9.

The two unique input polarisation states which lead to a maximum fringe visibility form two opposite 'poles' on the sphere, $SOP_{CW1}$ and $SOP_{CW2}$ (FIG. 8). For non-maximum fringe visibilities, polarisation states of equal fringe visibility form latitudinal belts, with the equatorial belt E representing the polarisation states of minimum fringe visibility. Moving away from the poles, towards the equatorial belt, say $B_1$ and $B_2$, which is midway between the two poles, the fringe visibility decreases and becomes a minimum at the equatorial belt E. Both "hemispheres" are essentially mirror images of each other.

The position of opposing maximum fringe visibility poles, and therefore the latitudinal and equatorial belts, will vary according to the birefringence of the bi-directional MZ system, namely the input lead 12 and MZ arms 14 and 15 for the CW direction. This can be thought of as a rotation of the fringe visibility poles and latitudinal belts around the sphere. The minimum fringe visibility is not necessarily always zero, as would be expected in an ideal MZ 10, but can be non-zero. The actual value of the minimum fringe visibility will also vary with the birefringence of the MZ 10 for that direction. So in summary, a change in birefringence in the MZ 10, which for the CW direction can include a change in the birefringence in the input lead length 12, and/or MZ sensor arms 14 and 15, can cause not only the fringe visibility poles and latitudinal belts to rotate, but can also change the range of fringe visibilities possible. Importantly, though, the maximum fringe visibility always approaches unity, irrespective of the birefringence of the MZ system.

Looking at the CCW direction of propagation (shown in FIG. 9) in the bi-directional MZ 10, a similar relationship between the fringe visibility of the MZ output and input polarisation states can be seen. The position of opposing maximum fringe visibility poles, and therefore the latitudinal and equatorial belts, will vary according to the birefringence of the bi-directional MZ system, which includes the input lead ($L_{lead1}$) and MZ arms 14 and 15. In fact, the minimum and maximum fringe visibility values are the same as for the CW direction for any given time, only the orientation of the poles, $SOP_{CCW1}$ and $SOP_{CCW2}$, and latitudinal bands is different when compared with the CW direction.

Just as is the case in a conventional unidirectional MZ, the PIFF effect will also be present in a bi-directional MZ for both directions. This means that not only will the fringe visibilities of the counterpropagating outputs vary with time, but non-equal birefringence induced phase lags in each counterpropagating output can introduce a phase error that will lead to incorrect calculation of the location of an event.

In the apparatus of the preferred embodiments, it is necessary to search and find the input polarisation states for the CW and CCW directions of the bidirectional MZ 10 which correspond to both MZ outputs having the same fringe visibility and being phase matched. Preferably, the fringe visibility needs to be continuously monitored.

For an apparatus which is using a standard continuous wave laser as its source, it is not possible to continuously monitor the fringe visibilities of the two MZ outputs, especially in the absence of disturbances. This is because the time taken for the MZ output intensities to go through a full fringe amplitude excursion will vary with time and will be a function of the random phase fluctuations in both arms 14 and 15 of the MZ 10, as well as the PIFF due to the random birefringence changes in the fibres along the length of the bi-directional MZ system.

One way to continuously monitor fringe visibility is by artificially creating fringes at the counterpropagating outputs of the bidirectional MZ. Fringes can be artificially created in a MZ by using a transducer in one of the sensing arms to modulate the phase of the light propagating through the fibre. However, for a practical system where it is preferable that the sensing cables are totally passive, this is not a practical solution.

A more practical technique for stimulating fringes in a fibre MZ is to modulate or dither the wavelength of the laser source 16. As long as there is a path length mismatch between the MZ arms 14 and 15, then the modulation in optical wavelength (which can also be expressed as an optical frequency) will lead to the creation of fringes. This comes about due to the wavelength dependent phase difference between the MZ arms caused by the path length mismatch. For a Mach Zehnder 10 with a path length mismatch $\Delta L$, the phase difference $\Delta \phi$ between the arms can be expressed by:

$$\Delta \phi = \frac{2\pi \cdot n_{co} \cdot \Delta L \cdot \Delta v}{c}$$

where $n_{co}$ is the refractive index of the fibre core, c is the speed of light in a vacuum, and $\Delta v$ is the laser's optical frequency change. In the case of a bidirectional MZ, as is described in FIG. 4, the phase difference $\Delta \phi$ between the arms of the MZ will be the same for each direction of propagation. It should be noted that the phase difference referred to here is additional to the phase difference between the arms which is induced by a perturbation event on the MZ sensor.

For a MZ whose operating point is at quadrature, a full fringe excursion can be achieved for a given path length mismatch by modulating the laser source's frequency/wavelength by an amount which results in $\Delta \phi = \pi^c$. For a typical fibre core index $n_{co}=1.46$, a path length mismatch $\Delta L=1$ m, and a full fringe $\Delta \phi = \pi^c$ will give an optical frequency dither of $$\Delta v = \frac{c \cdot \Delta \phi}{2\pi \cdot n_{co} \cdot \Delta L} = \frac{3 \times 10^8 \cdot \pi}{2\pi \cdot 1 \cdot 46 \cdot 1} = 102.75 \text{ MHz}$$

For a centre wavelength of 1550 nm, this corresponds to a wavelength dither of ~0.8 pm.

One of the simplest ways to modulate the wavelength of a standard laser diode is to modulate the drive current to the laser. These types of lasers however do not normally have a high enough coherence to be suitable for the applications discussed herein.

The pumped fibre laser source 16 requires a mechanical modulation of the fibre laser's cavity, or fibre Bragg gratings to achieve wavelength modulation. This can be achieved by using either a temperature tuning approach, or a mechanical piezo tuning approach using a piezo transducer (PZT). Since temperature tuning is very slow, the piezo tuning method is more suited to such a laser in order to achieve the wavelength dithering or modulation.

Figure 10:
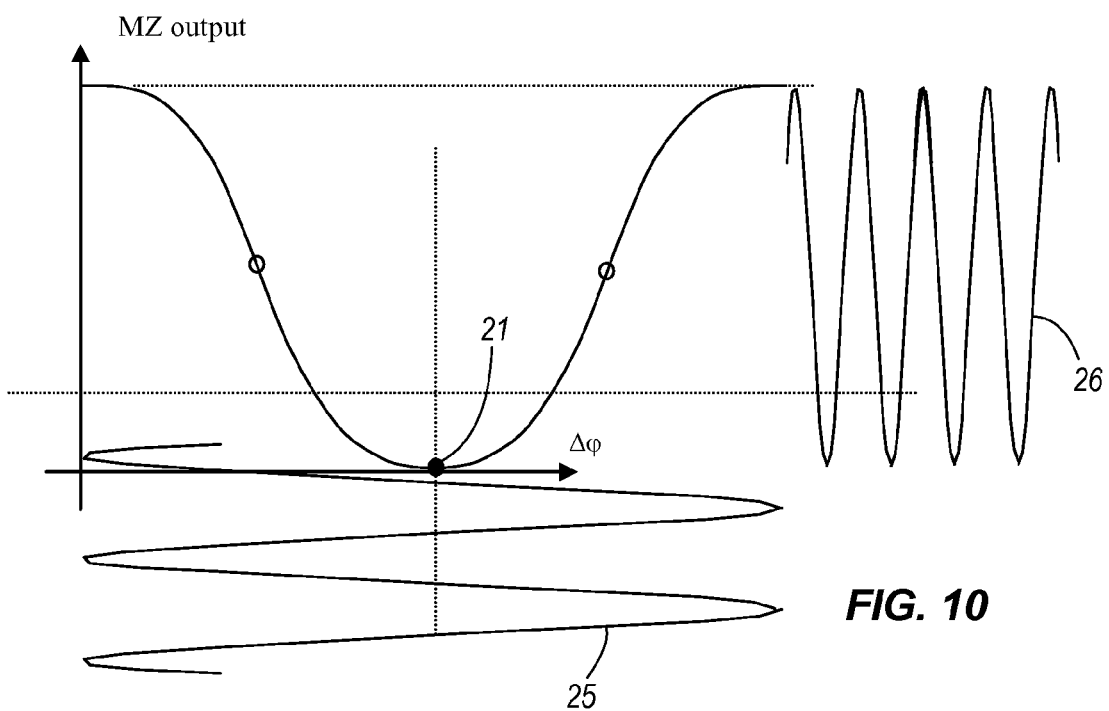
FIG. 10 is a graph showing the effect of wavelength dither of the light source on the output of the MZ used in one embodiment of the invention.

As illustrated in FIG. 10, in order to use the dithering of the laser wavelength to continuously monitor the fringe visibility of the MZ, it is necessary to create at least 2 full artificial fringes 26 per cycle of PZT modulation 25. This requirement is determined by the fact that the operating point 21 of the MZ drifts in and out of quadrature with time, and the creation of only one full fringe, that is, $\Delta\phi=180°$, would not be sufficient to continuously show the true fringe visibility.

If the dithering is used to achieve at least 360° of phase modulation at all times, the true fringe visibility of the stimulated fringes can be continuously monitored, irrespective of the drift of the MZ output's operating point.

To make sure that the stimulated fringes do not interfere with the fringes created by the events which are to be sensed by the apparatus, it is important for the frequency of the stimulated fringes to be in a frequency range well outside that of the event signals detected by the apparatus. For example, in a typical installation, where the frequency range of interest may be 0-20 kHz, the fundamental frequency of the stimulated fringes should be higher, eg. 50 kHz.

Figure 11:
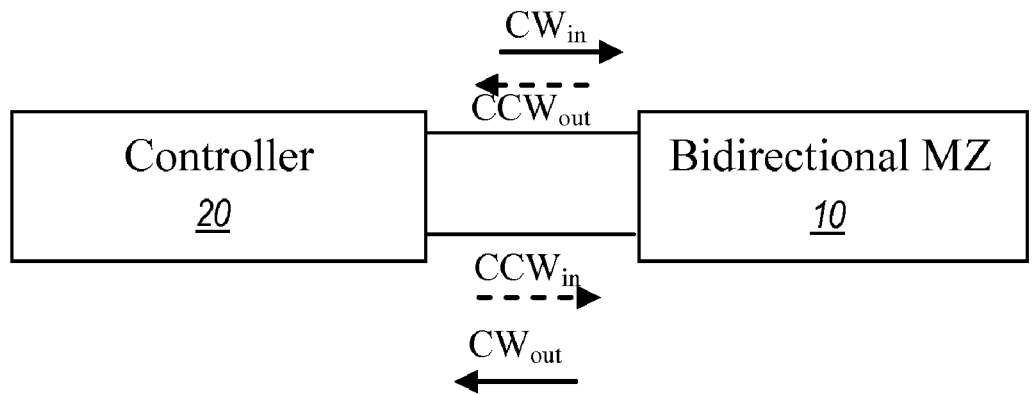
FIG. 11 is a block diagram of a first embodiment of the invention.

FIG. 11 is a schematic block diagram of a first embodiment of the invention in which the controller 20 is separated from the Mach Zehnder interferometer 10 which forms the sensing system of the various embodiments.

Figure 12:
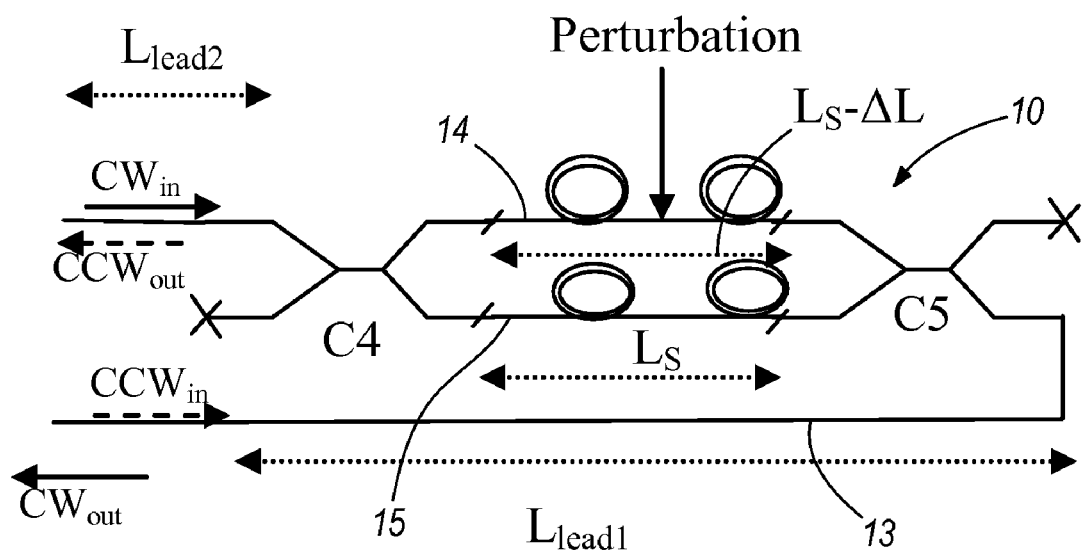
FIG. 12 is a block diagram of one embodiment.

As shown in FIG. 12, the Mach Zehnder interferometer 10 has a path length mismatch of $\Delta L$ between the arms 14 and 15 so that one of the arms 14 has a length $L_s - \Delta L$ and the arm 15 has a length $L_s$. The path length mismatch is required to achieve stimulation of artificial fringes by dithering the wavelength of the laser source 16. One input of the coupler C4 is used as the clockwise input to the Mach Zehnder 10 and the other input of the coupler C4 is not used as in the earlier embodiment. Similarly, one of the inputs of the coupler C5 is connected to fibre 13 and provides the input for the counter-propagating signal and the other arm of the coupler C5 is also not used.

Figure 13:
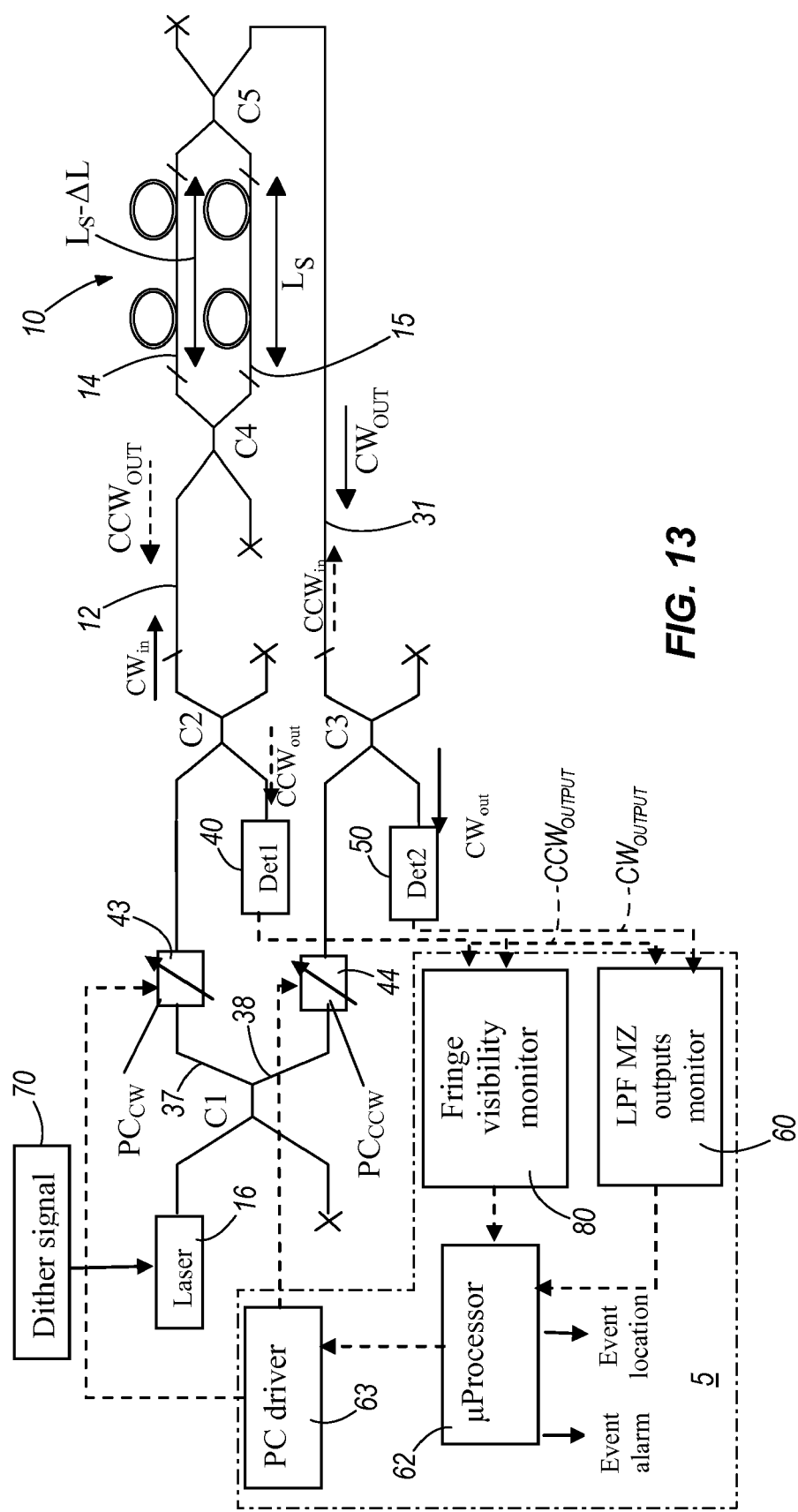
FIG. 13 is a block diagram of the controller of the embodiment of FIG. 11.

FIG. 13 is a view of one embodiment of the invention. Like reference numerals indicate like parts to those described with reference to FIG. 4. The apparatus of FIG. 13 has a main controller 5 which in this embodiment is made up of fringe visibility monitor 80, output monitor 60, processor 62 and driver 63.

As is apparent from FIGS. 4 and 13, light from laser 16 is received by coupler C1 and launched into arms 37 and 38 and therefore to polarisation controllers 43 and 44. Light from the controller 43 is received by coupler C2 and launched into lead-in fibre 12 and then via coupler C4 into arms 14 and 15 of the Mach Zehnder interferometer 10. That light is then received by coupler C5 where it combines and interferes to produce fringes, and is then launched into fibre 31 for receipt by detector 50. Light from coupler C1 is also received by polarisation controller 44 which supplies the light to coupler C3 and to lead-in fibre 31 to coupler C5 so the light propagates through both arms 14 and 15 (in the opposite direction to that coming from the coupler C4 into the arms 14 and 15) of the Mach Zehnder interferometer 10 and combines at coupler C4. Again, the light interferes to produce fringes. The light then passes through fibre 12 to coupler C2 and is detected by detector 40. Thus, counter-propagating signals travel through both arms 14 and 15 of the Mach Zehnder interferometer 10. The counter-propagating signals which recombine and interfere at the couplers C4 and C5 are supplied to detectors 40 and 50 respectively and comprise the counter-propagating signals $CCW_{out}$ and $CW_{out}$, as shown in FIG. 13, which are the signals which are to be phase matched in order to provide good detection of a perturbation or event and location of that perturbation or event. Amplitude and phase matching is achieved by controlling the polarisation states by the polarisation controllers 43 and 44 of the input counter-propagating signals $CW_{in}$ and $CCW_{in}$, as shown in FIG. 13. If there is a perturbation along the length of the arms 14 and 15, the signals travelling along those arms are modified and the counter-propagating modified signals which recombine at the couplers C4 and C5 interfere to produce a changed interference pattern and those modified counter-propagating signals indicative of the changed pattern are detected by the detectors 40 and 50 so that the time difference between receipt of the modified signals can be determined to locate the position of the perturbation.

The output of the detectors 40 and 50 is monitored by output monitor 60 and the perturbation or event is determined by passing digitised versions of both output signals detected by the detectors 40 and 50 through a band pass filter having, for example, a band width of 1 kHz to 20 kHz. The arrival of the modified propagating signals within this bandwidth, and the time difference between receipt of the counter-propagating signals enables the event or perturbation to be recognised and also the location of the event to be determined.

In this embodiment the laser 16 is a diode pumped bragg grating base doped fibre laser. To dither the wavelength of the laser 16, a piezoelectric transducer (not shown) is used, for example, on the internal bragg gratings in the fibre laser to modulate the output wavelength of the laser 16.

To phase match the signals $CCW_{out}$ and $CW_{out}$ which are received from the arms 14 and 15 and from coupler C4 and C5 when the MZ 10 is at rest (i.e. no event or disturbance is being detected) artificial fringes are created at the couplers C4 and C5 and detected at the detectors 40 and 50. The artificial fringes are created by a dither signal, which has a frequency above the event frequency of the perturbations which are expected to be provided to the Mach Zehnder 10 and sensed by the Mach Zehnder 10, is applied to the laser 16 from dither signal source 70. This dithers the wavelength of the laser and effectively creates fringes whose frequency consists of the dither frequency and harmonics of the dither frequency (as has been described in detail with reference to FIG. 10).

By using the suitable path length mismatch $\Delta L$ previously described and adjusting the amplitude of the dithering, continuous fringes are created at the outputs (i.e. couplers C4 and C5) of the Mach Zehnder 10 and which are supplied to the detectors 40 and 50. The outputs which are received by the detectors 40 and 50 will be composed of the dither frequency as well as harmonics of the dither frequency. The fringe visibility monitor 80 is connected to the detectors 40 and 50 for detecting the artificial fringes and determining the fringe visibility for each direction. The frequency range of the artificial fringes is above the event signal frequency range caused by a perturbation. Microprocessor 62 uses a suitable control algorithm, such as a simulated annealing control algorithm (to be described in detail hereinafter), to search and adjust the input polarisation controllers $PC_{cw}$ and $PC_{ccw}$ via driver 63 so that the stimulated artificial fringes are at a maximum visibility and phase matched. Once a suitable input polarisation state from each of the controllers is achieved, that polarisation state is set. A control algorithm is used to adjust the input polarisation controllers $PC_{cw}$ 43 and $PC_{ccw}$ 44 to counteract any PIFF, so that the phase matched maximum fringe visibility condition is maintained.

The fringe visibility monitor 80 is constructed using circuits which continuously measure the maximum and minimum levels of the stimulated fringes from the bidirectional MZ 10 outputs (i.e. $CCW_{out}$ and $CW_{out}$). These levels are then used to calculate the fringe visibility (FV) of the outputs, which is given by $$FV = \frac{\max - \min}{\max + \min},$$

where max is the maximum peak level and min is the minimum peak level. The degree of phase matching can also be measured by using a difference circuit to subtract one of the counterpropagating outputs from the other. If the stimulated fringes are phase matched, this difference will approach a minimum, that is, ideally zero. An additional Max and Min peak detector is used to measure the amplitude of the difference signal. This is shown in FIG. 14.

Figure 14:
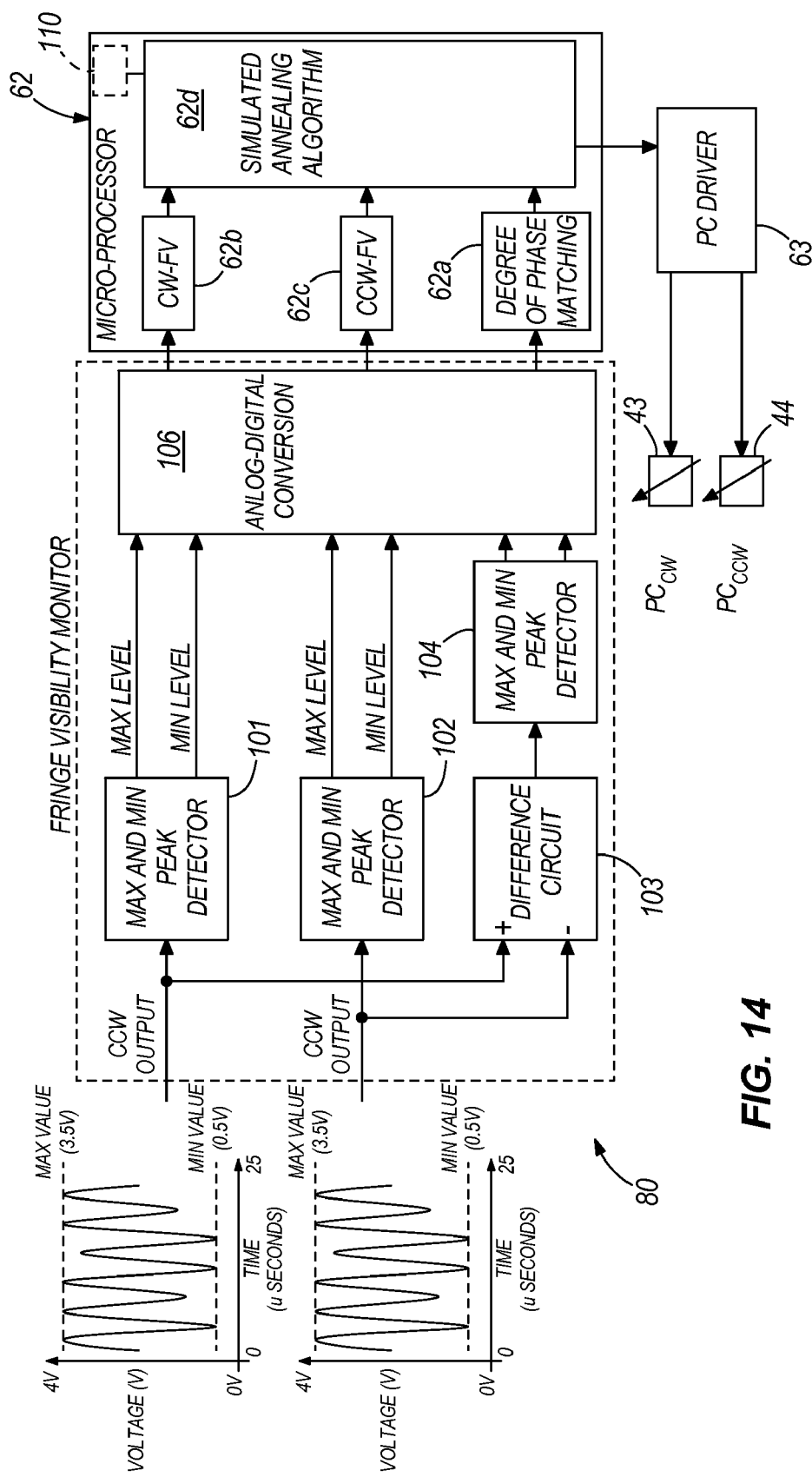
FIG. 14 is a more detailed block diagram of part of the embodiment of FIG. 13.

With reference to FIG. 14, the two optical outputs of the bidirectional MZ, $CCW_{out}$ and $CW_{out}$, are received by detectors 40 and 50 from couplers C4 and C5 (FIG. 13) respectively. The detectors 40 and 50 each consist of an optical detector and transimpedance amplifier to convert the optical outputs to electrical voltage signals, CW output and CCW output (in FIG. 14). The monitor 80 takes these two signals and uses a Max and Min peak detector circuit 101 and 102 on each signal to determine the maximum and minimum voltage levels for each signal. These levels are passed to μProcessor 62 via an analog-to-digital converter to continuously determine and monitor the fringe visibility of each output. A difference circuit 103 also subtracts one of the outputs from the other and an additional Max and Min peak detector 104 is used to generate the maximum and minimum levels of this difference. The maximum and minimum levels of the difference signal are passed to the μProcessor via an analogue to digital converter 106 and a degree of phase matching between the two outputs is continuously calculated and monitored (as represented by processing section 62*a*). A high degree of phase matching corresponds to a very small difference between the maximum and minimum levels. Once the fringe visibility of the two bidirectional MZ outputs are calculated (as represented by processing sections 62*b* and 62*c*) and the degree of phase matching between them is determined, these are used by a simulated annealing based algorithm (as represented at 62*d*) to adjust and control the two input polarisation controllers, $PC_{CW}$ 43 and $PC_{CCW}$ 44, via the PC driver 63, to adjust the counterpropagating input polarisations of the bidirectional MZ to in turn control and adjust the fringe visibilities and phase matching between the two MZ outputs (this is essentially a feedback loop).

The polarisation controllers provide endless polarisation control, that is, have the ability to convert any arbitrary input polarisation state into any desirable polarisation state. This can be represented on the Poincare sphere as covering the whole surface of the sphere. Preferably electronically controlled polarisation controllers, such as those with at least three liquid crystal based voltage adjustable retarder stages should be used. This does not exclude any other types of electronically controlled polarisation controllers (non liquid crystal based). In this example, four-stage liquid crystal based polarisation controllers are used. The polarisation controllers adjust the polarisation state of the light propagating through them with the use of four square wave voltages amplitudes, one for each adjustable retarder stage. Each polarisation state can therefore be represented by a set of four square wave voltage amplitudes.

When using a bidirectional MZ 10 as a locating sensor, at any given time, it is necessary to be able to search and find any one of two possible pairs of suitable counterpropagating input polarisation states which lead to maximum fringe and phase matched outputs when the sensor is in the rest state. In this embodiment, the simulated annealing based algorithm will be described for doing this. The flow charts for this algorithm are shown in FIGS. 15 and 16.

It is important to note that the algorithm needs no absolute knowledge of the input polarisation states and only sends 4 control voltage amplitudes to each polarisation controller. No knowledge of exactly where on the Poincare sphere either input polarisation state lies is required. Each polarisation state ($SOP_n$) which is set by each polarisation controller is represented only by a set of four voltage amplitudes ($SOP_n=(V_1, V_2, V_3, V_4)$). By adjusting these voltages, the polarisation states can be controlled. With this algorithm, there is also no need to calibrate the voltages against actual polarisation states. The Poincare sphere will however be used to illustrate the different concepts described herein.

Figure 15:
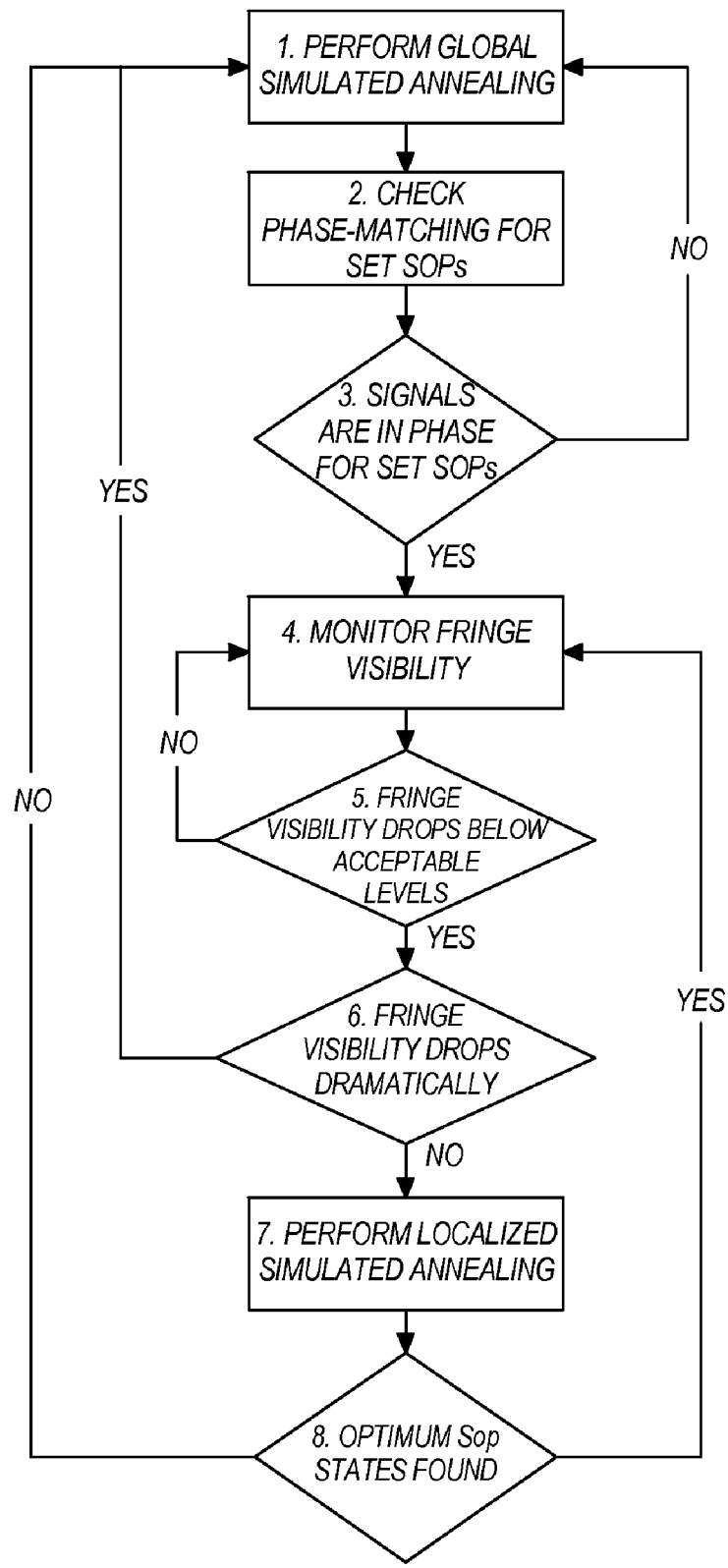
FIG. 15 is a flowchart explaining operation of the preferred embodiment of the invention.
Figure 16:
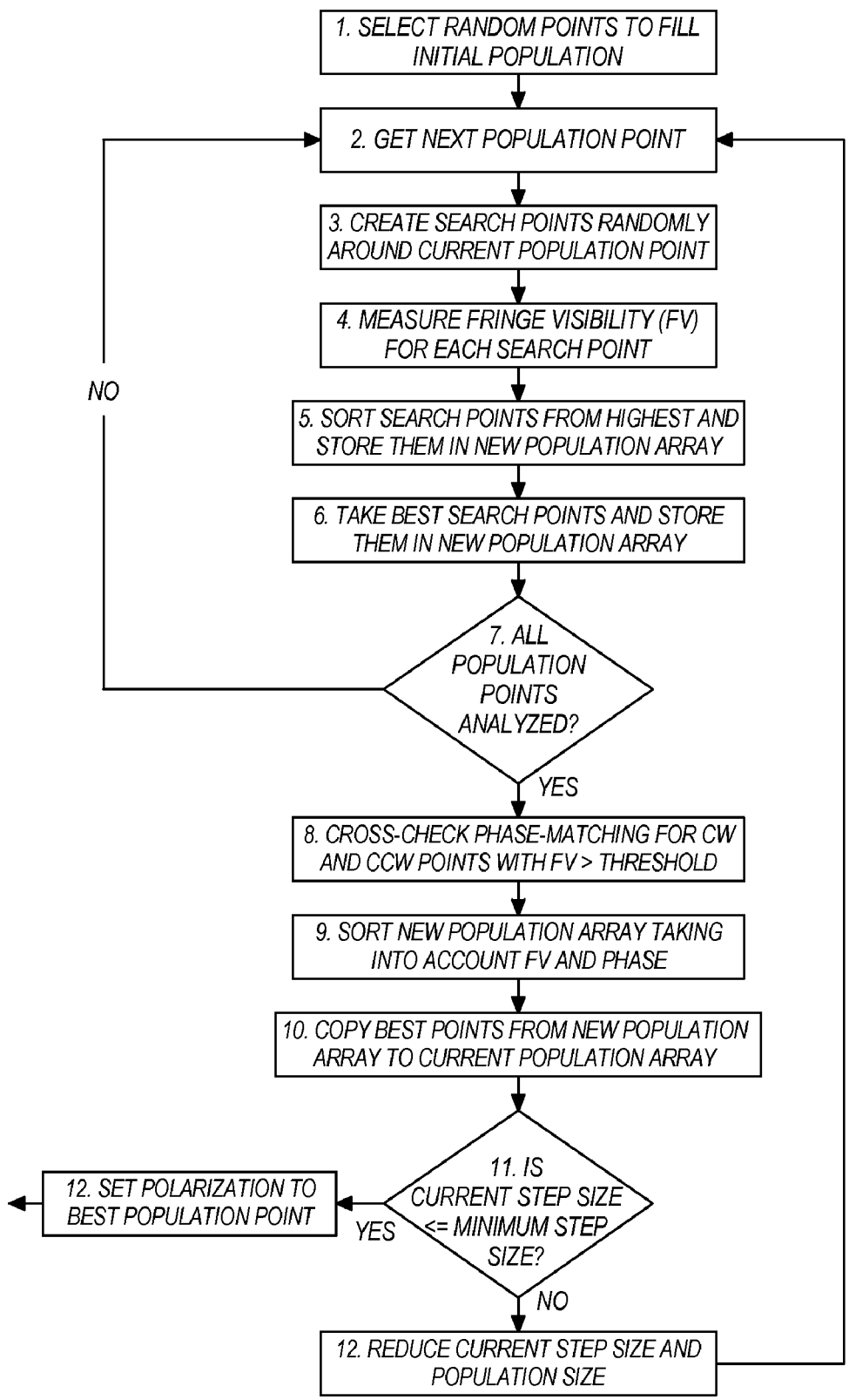
FIG. 16 is a flowchart explaining in more detail some of the steps of the flowchart of FIG. 15.

To find the counterpropagating input polarisation states which lead to phase-matched maximum fringe outputs for the bidirectional MZ outputs, the polarisation control algorithm will first enter a Global Simulated Annealing state (state 1 in FIG. 15).

The Global Simulated Annealing algorithm is an efficient and iterative way for quickly searching and finding the phase-matched maximum fringe outputs for both directions of the bidirectional MZ. The Global Simulated Annealing algorithm is actually described in more detail in FIG. 16. The algorithm initially selects a specified number of random input polarisation states for each direction, where each input polarisation state is represented by a set of 4 voltage amplitudes. This makes up an initial population of input polarisation states around which a search space will be defined (state 1 in FIG. 16). The actual set of voltage amplitudes, $V_1, V_2, V_3$, and $V_4$, for each input polarisation state that makes up the initial population, is chosen randomly between a fixed voltage range to produce an initial population of input polarisation states which are essentially randomly distributed over the whole Poincare sphere. This is important, because given the polarisation behaviour of the bidirectional MZ as illustrated in FIGS. 2 and 5, it ensures that a large range of corresponding output fringe visibilities will be initially chosen and analysed for each direction during the search. This includes polarisation states which are very close to the corresponding maximum fringe poles (see FIG. 17). For example, an initial voltage range, which causes at least 180 degree retardation in each plate of the polarisation controller (which translates to 360 degree rotation on the Poincare Sphere), can be used.

Figure 17:
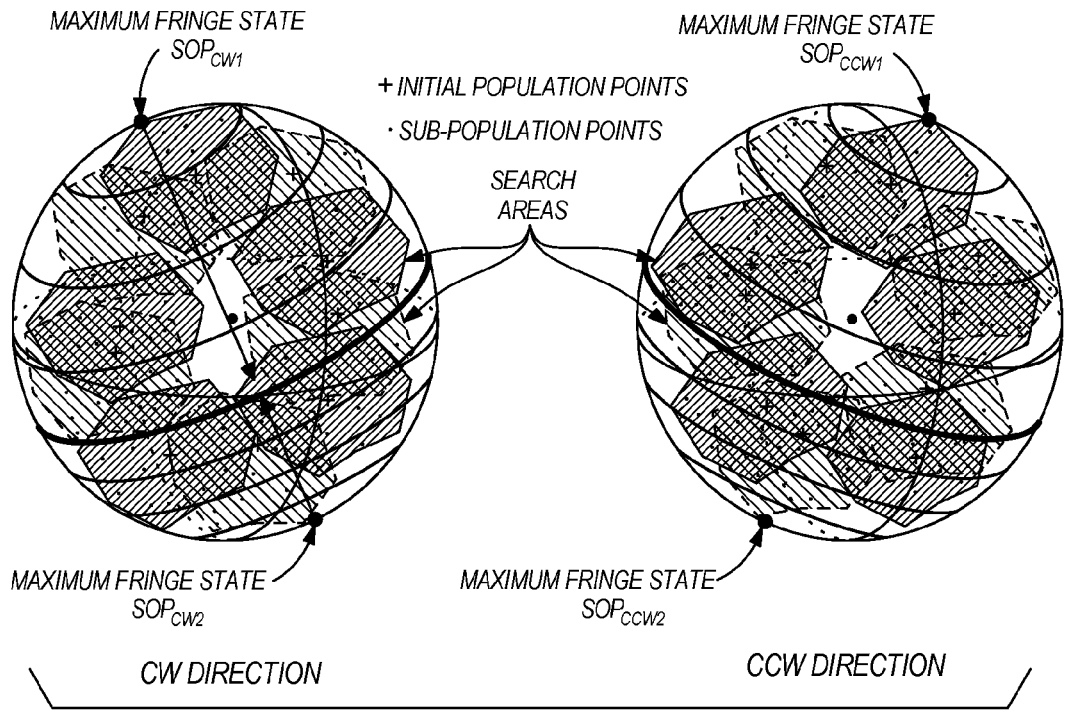
FIG. 17 depicts diagrams of Poincare spheres used to further explain the preferred embodiment of the invention.

A search space, defined by a number of sub-population points around each initial population point is determined by randomly varying the set of voltage amplitudes for that population point within a defined range, or step size, which corresponds to a significant area on the Poincare sphere (for example about 10%-20%). As long as enough initial population points are chosen, the total search space should effectively cover most of the Poincare sphere. This is illustrated in FIG. 17 for both directions in the bidirectional MZ. Search spaces are shown at both the foreground and background of the spheres (state 3 in FIG. 16).

Note that FIG. 17 is for the purposes of illustrating the algorithm. In reality, the search areas can vary in size, shape, and can also overlap. The important thing is that for the first iteration, the Global search spaces in total, cover most the Poincare Sphere. This search state is therefore known as a Global Simulated Annealing search which is described in FIG. 16.

Using the signals from the Fringe Visibility Monitor 80, as indicated in FIG. 14, fringe visibilities of the sub-population points around each population point are calculated. The sub-population points with the highest fringe visibilities are copied into a new list in memory 110 that will eventually become the list of population points for the next simulated annealing iteration.

The process of checking the fringe visibilities of each sub-population point for each population point, and then copying those with the highest fringe visibilities into a new list of population points continues until all current population points have been evaluated. This process takes place in both the CW and CCW directions simultaneously.

At this stage of the process there will be a new list of population points for both the CW and CCW directions. If there are population points with fringe visibilities above a specified threshold (normally around 90%) for both the CW and CCW directions, then their corresponding counterpropagating outputs are cross-checked for phase matching. The degree of phase matching is calculated using the maximum and minimum peak level signals from the difference circuit in the Fringe Visibility Monitor as was described by FIG. 14 (states 4 to 8 in FIG. 16).

The new lists of population points for both the CW and CCW directions are sorted based on both the fringe visibility of each point and their degree of phase-matching (state 9 in FIG. 16).

The size of the search area around each of the population points is reduced, as well as the maximum number of population points for next simulated annealing iteration (state 10 to 12 in FIG. 16).

The new lists of population points are culled to ensure that we do not have more than the maximum number of population points, with only the best possible input polarisation states being retained (based on the earlier sort).

It is important to stress that dithering the wavelength of the laser 16 by applying a sinusoidal voltage to the piezo device in the laser 16 generates the stimulated artificial fringes in the MZ 10. The fringe visibility (amplitude) of these stimulated fringes however is not affected by the dithering, but rather the birefringence changes in the fibre MZ system. By adjusting the polarisation controllers 43 and 44 at the inputs, the fringe visibility of the CW and CCW outputs can be controlled. So it is actually the polarisation controllers at the inputs which change the fringe visibility.

The polarisation controllers are each made up of 4 liquid crystal based retarder plates (each plate is essentially a birefringent medium). Each plate requires a square wave voltage. By applying 4 square wave voltages to each plate, each different amplitudes, allows the polarisation controller to adjust any input polarisation state to any desired polarisation state (you need at least three plates to do this). These voltages are generated by the PC driver 63. The PC driver generates 8 square wave voltages (2 pol controllers=2×4 voltage amplitudes), whose amplitude is variable and controlled by the uProcessor 62 according to the polarisation control algorithm (Simulated Annealing). The voltage amplitudes are within a given range.

To set a polarisation state, a set of 4 voltage amplitudes is thus sent to each polarisation controller 43, 44. When the global search is started, it initially randomly sets these voltages between a certain range or each plate and each population point, that will correspond to a number of population points which cover the whole sphere. By controlling this range, the search area is controlled.

The iterative process of analysing search areas (sub population points) around population points, creating new lists of population points based on fringe visibility and phase matching, and contracting the search areas, continues until some minimum search area is reached.

A number of Simulated Annealing iterations can therefore be performed in this way which has the effect of homing in on the input polarisation states which lead to maximum or very-near maximum fringe visibility outputs for the bidirectional MZ. This means that the iterative search will eventually home in on the maximum fringe visibility poles for the CW and CCW Poincare sphere. This Simulated Annealing process is described by the flow chart representation of FIG. 16 which is applicable to both the Global and Local Simulated Annealing states (the Local Simulated Annealing State will be described later).

The second iteration of the Global Simulated Annealing state will produce a smaller number of new population points compared to the previous search. This is illustrated in FIG. 18.

Figure 18:
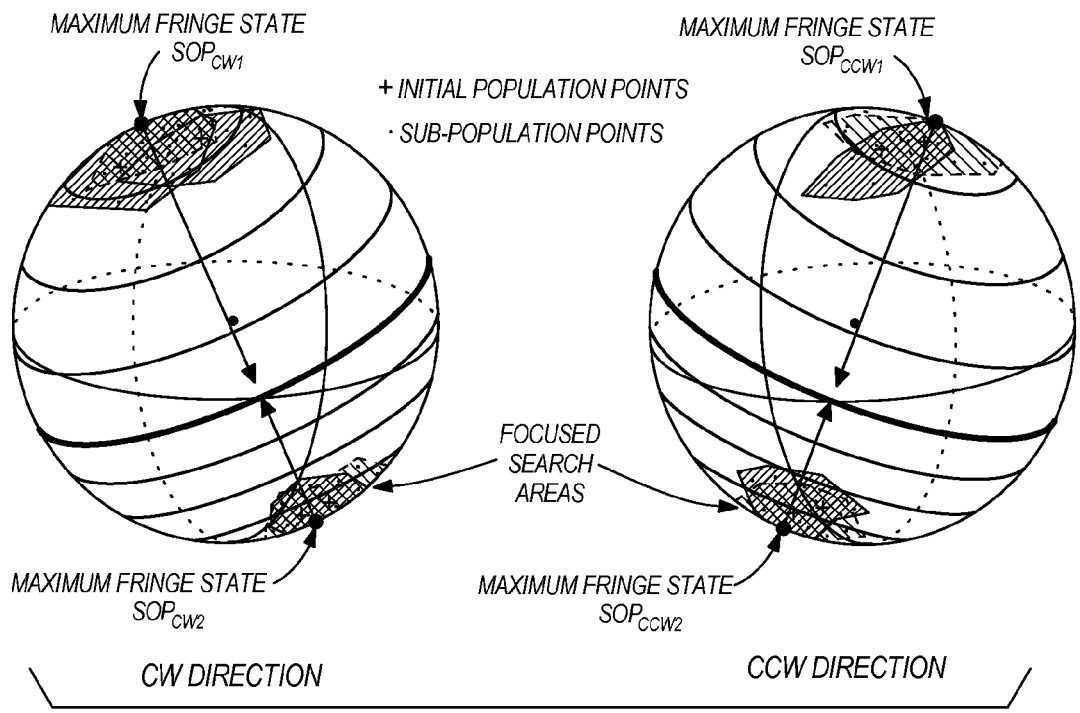
FIG. 18 depicts diagrams of Poincare spheres used to further explain the preferred embodiment of the invention.

As can be seen in FIG. 18, the second Global Simulated Annealing iteration has a smaller number of population points, and a smaller search area, the latter controlled by the allowable voltage range or step size when randomly choosing sub-population points about the population points.

Typically it should only take two or three Simulated Annealing iterations for a Global Simulated Annealing search to home in on the input polarisation states (each represented by sets of 4 voltage amplitudes), that lead to phase-matched maximum or very-near maximum fringe visibilities for each direction of the MZ. In reality they will be sets of 4 plate voltages amplitudes that represent the input polarisation states which are very close to or exactly on the two ideal maximum fringe visibility points for each direction of the bidirectional MZ.

Once the final Global Simulated Annealing iteration is completed and a pair of these counterpropagating input polarisation states is found which has a specified high degree of phase matching, this pair of counterpropagating input polarisation states is selected and the polarisation controllers are adjusted to these optimum states which will lead to accurate locations when an event occurs on the bidirectional MZ sensor (note, as a double check, the degree of phase matching can be verified after setting the polarisation controllers). The pair of input polarisation states chosen by the algorithm is in reality one of the two pairs of possible counterpropagating input polarisation states that lead to phase-matched and maximum fringe outputs that are known to always exist in a bidirectional MZ, as shown in FIG. 5. This refers to states 2 and 3 in FIG. 15.

The polarisation control algorithm now continuously monitors the output fringe visibilities of the bidirectional MZ (state 4 in FIG. 15). Any changes in the bidirectional MZ's birefringence, which can occur due to environmental effects, will cause a variation in output fringe visibilities and phase matching. When one or both of these fringe visibilities drops below a predetermined threshold (for example <90%), a Simulated Annealing state is entered to find the new optimum polarisation states which lead to phase matched maximum fringes.

If the fringe visibility of the output signals drops dramatically then a Global Simulated Annealing is performed (state 6 to state 1 in FIG. 15).

If the fringe visibility of the output signals only drops by a small amount, it may only be necessary to do a search of a small area around the current polarisation position to bring the system back to its optimum state. In this case a Localised Simulated Annealing process takes place (state 7 in FIG. 15).

The Localised Simulated Annealing works in exactly the same way that the Global Simulated Annealing works except for the way that the initial population points are selected. The Local Simulated Annealing search, in comparison uses a reduction in population points, and a more focussed search area, that is, smaller voltage range, or voltage step size (set in states 1, 3 and 12 of FIG. 16).

In the case of the Localised Simulated Annealing, initial population points are chosen as random points within a relatively smaller specified area around the current polarisation state (as opposed to selecting random points from all over the Poincare sphere for the Global Simulated Annealing initial population). After the initial population has been set up, the Local Simulated Annealing algorithm works in exactly the same way as the Global Simulated Annealing (see FIG. 16).

If the Localised Simulated Annealing fails to find the optimum polarisation states a Global Simulated Annealing may then be performed (state 8 to state 1 in FIG. 15).

In most situations, after an initial Global Simulated Annealing search, corrections will usually only involve one Local Simulated Annealing search (states 4 to 8 in FIG. 15).

Figure 19:
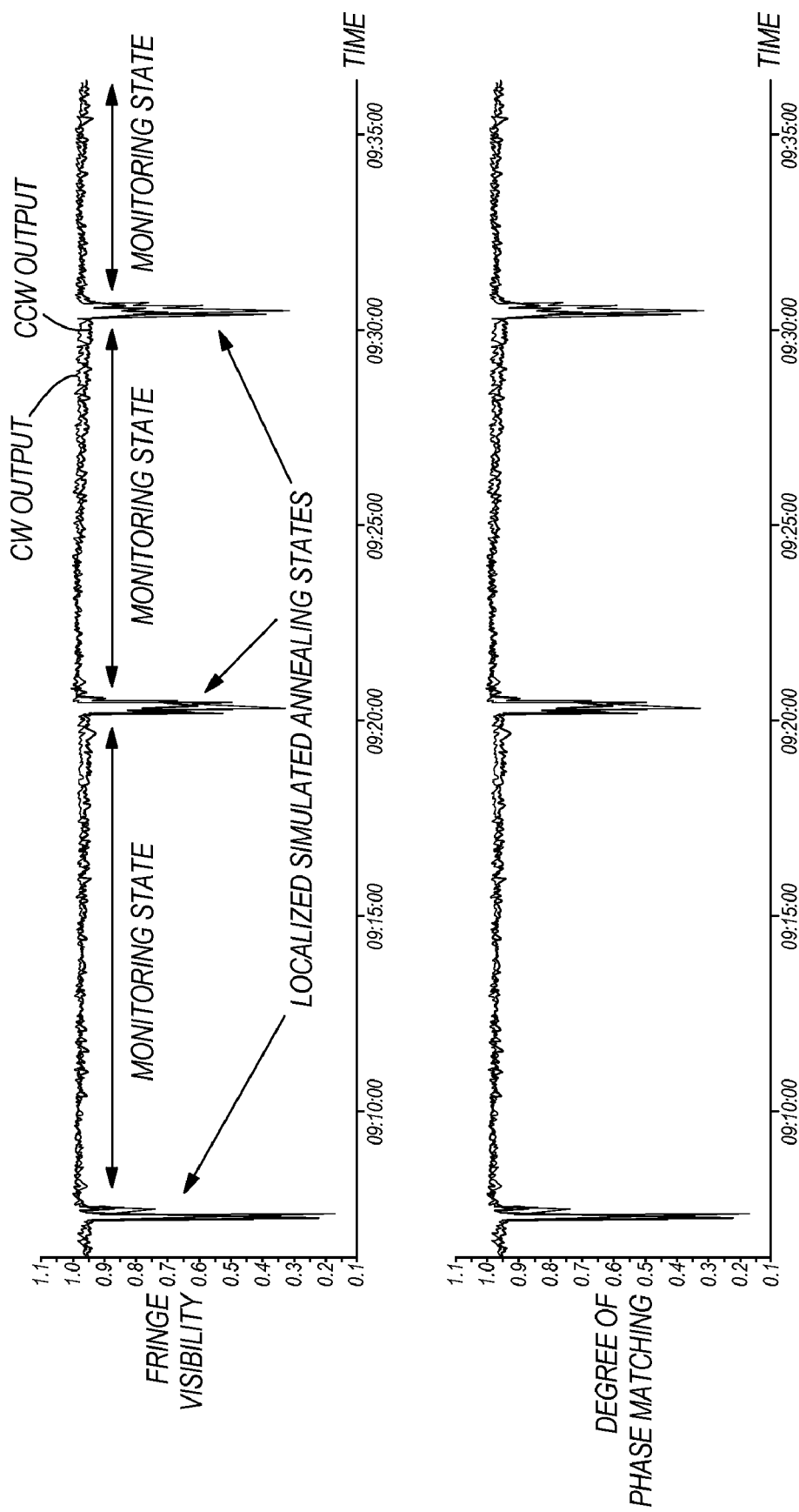
FIG. 19 is graphs showing simulated corrections.

An example of controlling the fringe visibility and degree of phase matching of the outputs of a bidirectional MZ is shown in FIG. 19 for a MZ with an approximately 3 km sensing arm. It shows consecutive localised annealing states to correct variations in the birefringence and therefore fringe visibilities of the bidirectional MZ. The degree of phase matching is normalised to a value of 1, where the best degree of phase matching is 1. Note that a Localised Simulated Annealing takes place when either of the fringe visibilities of the MZ outputs drops below 0.95.

Since modifications within the spirit and scope of the invention may readily be effected by persons skilled within the art, it is to be understood that this invention is not limited to the particular embodiment described by way of example hereinabove.

In the claims which follow and in the preceding description of the invention, except where the context requires otherwise due to express language or necessary implication, the word "comprise", or variations such as "comprises" or "comprising", is used in an inclusive sense, i.e. to specify the presence of the stated features but not to preclude the presence or addition of further features in various embodiments of the invention.

The invention claimed is:

1. An apparatus for locating the position of an event, comprising:
   a light source;
   a dither circuit for modulating or dithering the wavelength of the light produced from the light source;
   a waveguide for receiving light from the light source so that the light is caused to propagate in both directions along the waveguide to thereby provide counter-propagating optical signals in the waveguide, the waveguide being capable of having the counter-propagating optical signals or some characteristic of the signals modified or affected by an external parameter caused by or indicative of the event to provide modified counter-propagating optical signals which continue to propagate along the waveguide;
   wherein the waveguide comprises a first arm for receiving the counter-propagating signals, and a second arm for receiving the counter-propagating signals, the first and second arms forming a Mach Zehnder interferometer, wherein a path length mismatch exists between the first and second arms of the Mach Zehnder interferometer;
   a detector for detecting the modified counter-propagating optical signals affected by the parameter and for determining the time difference between the receipt of the modified counter-propagating optical signals in order to determine the location of the event;
   polarisation controllers for setting the polarisation states of the counter-propagating optical signals; and
   a main controller for controlling the polarisation controllers so that the output signals are phase matched;
   the main controller comprising:
   (i) a fringe visibility monitor having:
      (a) a circuit for determining a maximum and minimum value of each counter-propagating optical signal after the signals have passed along the first and second arms in one direction and recombined and interfered to create fringes, and after the signals have passed along the first and second arms in the opposite direction and recombined and interfered to produce fringes; and
      (b) a circuit for determining the difference between the counter-propagating optical signals; and
   (ii) a processor for determining fringe visibility of the fringes by the ratio (max−min)/(max+min) wherein max is the maximum value and min is the minimum value, the processor having a memory for storing polarisation states corresponding to each fringe visibility and determining those which provide maximum fringe visibilities, the processor also being for determining phase matching of the counter-propagating output signals by determining at least one pair of the stored polarisation states providing the maximum fringe visibilities and which correspond to a minimum difference between the counter-propagating optical output signals; and
   the processor being for setting the polarisation controllers to at least one pair of optimum polarisation states that achieve phase matched output signals.

2. The apparatus of claim 1 wherein the fringe visibility monitor is for continuously monitoring fringe visibility so that when maximum fringe visibility drops below a predetermined threshold, the processor again determines at least one pair of polarisation states which provide maximum fringe visibility and phase matched output signals, and resets the polarisation controllers to the polarisation states corresponding to the at least one pair of polarisation states.

3. The apparatus of claim 1 wherein the detector comprises a first detector for one of the counter-propagating signals and a second detector for the other of the counter-propagating signals.

4. The apparatus of claim 3 wherein the processor is also for receiving outputs from the detectors and for processing the outputs to indicate an event and to determine the location of the event.

5. The apparatus of claim 4 wherein the detectors are connected to a Mach Zehnder output monitor for monitoring the counter-propagating signals detected by the detectors so that when the modified counter-propagating signals are detected, outputs from the monitor are supplied to the processor to determine the location of the event.

6. The apparatus of claim 1 wherein the dither circuit dithers the phase difference between the arms of the Mach Zehnder interferometer by at least 360°.

7. The apparatus of claim 1 wherein the processor is for determining at least two pairs of polarisation states and one pair of those two pairs of polarisation states is used to set the polarisation controllers.

8. The apparatus of claim 1 wherein the processor is for determining at least one pair of the stored polarisation states which provides the maximum fringe visibility.

9. A method of locating an event comprising the steps of:
launching light into a waveguide so that the light is caused to propagate in both directions along the waveguide to thereby provide counter-propagating optical signals in the waveguide, the waveguide being capable of having the counter-propagating optical signals or some characteristic of the signals modified or affected by an external parameter caused by the event, to provide modified counter-propagating optical signals which continue to propagate along the waveguide;
the waveguide being formed as a Mach Zehnder interferometer having a first arm through which the counter-propagating optical signals travel, and a second arm through which the counter-propagating optical signals travel;
dithering the wavelength of the light;
substantially continuously and simultaneously monitoring the modified counter-propagating optical signals, so that when an event occurs, both of the modified counter-propagating optical signals affected by the external parameter are detected;
determining the time difference between the detection of the modified signals in order to determine the location of the event; and
controlling the polarisation states of the counter-propagating optical signals input into the waveguide to provide phase matched counter-propagating output signals from the waveguide by:
 (i) determining a maximum and minimum value of each counter-propagating optical signal;
 (ii) determining the difference between the values of the counter-propagating optical signals;
 (iii) determining fringe visibility by the ratio (max−min)/(max+min) where max is the maximum value and mm is the minimum value;
 (iv) determining at least one pair of polarisation states which produce maximum fringe visibilities and a minimum difference between the counter-propagating signals; and
 (v) controlling the polarisation states of the counter-propagating optical signals in accordance with the pair of polarisation states.

10. The method of claim 9 further comprising continuously monitoring fringe visibility so that when maximum fringe visibility drops below a predetermined threshold, the at least one pair of polarisation states is again determined and the polarisation of the counter-propagating signals is reset in accordance with the at least one pair of polarisation states.

11. The method of claim 9 wherein the light wavelength is dithered by an amount which leads to the dithering of the phase difference between the arms of the Mach Zehnder interferometer by 360°.

12. The method of claim 9 wherein at least two pairs of polarisation states are determined and the polarisation states of the counter-propagating optical signals are set to one pair of those two pairs of polarisation states.

13. The method of claim 9 wherein the at least one pair of polarisation states provides counter-propagating optical signals which are amplitude and phase matched.

14. An apparatus for locating the position of an event, comprising:
a light source;
a waveguide for receiving light from the light source so that the light is caused to propagate in both directions along the waveguide to thereby provide counter-propagating optical signals in the waveguide, the waveguide being capable of having the counter-propagating optical signals or some characteristic of the signals modified or affected by an external parameter caused by or indicative of the event to provide modified counter-propagating optical signals which continue to propagate along the waveguide;
wherein the waveguide comprises a first arm for receiving the counter-propagating signals, and a second arm for receiving the counter-propagating signals, the first and second arms forming a Mach Zehnder interferometer;
a detector for detecting the modified counter-propagating optical signals affected by the parameter and for determining the time difference between the receipt of the modified counter-propagating optical signals in order to determine the location of the event;
a dither circuit for dithering the wavelength of the light produced by the light source to produce fringes when the counter-propagating signals recombine and interfere after passing through the arms of the Mach Zehnder interferometer;
polarisation controllers for setting the polarisation states of the counter-propagating optical signals so that the counter-propagating output signals detected by the detector are phase matched; and
a main controller for controlling the polarisation controllers by monitoring fringe visibility of the fringes produced from the counter-propagating optical signals when the signals passing through the first and second arms recombine and interfere, and for determining, when the fringe visibility drops below a predetermined value, new polarisation states corresponding to maximum fringe visibilities and a minimum difference between the counter-propagating signals, and for controlling the polarisation controllers to set the polarisation states of the counter-propagating optical signals in accordance with the new polarisation states.

15. The apparatus according to claim 14 wherein the dither circuit continuously dithers the wavelength of the light at an electrical frequency outside the expected electrical frequency band caused by a detected perturbation.

16. The apparatus of claim 15 wherein the perturbation has a frequency in the bandwidth from 1 kHz to 20 kHz and the apparatus includes a band pass filter for filtering outputs from the detectors to the bandwidth from 1 kHz to 20 kHz for perturbation detection and location of the perturbation.

17. The apparatus according to claim 16 wherein the dithered wavelength of the light is produced by a dithering frequency above 50 kHz.

18. The apparatus according to claim 14 wherein the main controller is for performing a global iterative search to initially select a plurality of random input polarisation states randomly distributed over a Poincare sphere to determine the initial polarisation states to which the polarisation controllers are set for providing phase matched counter-propagating signals, and if fringe visibility drops below the predetermined value, a localised search around the previously set polarisation states is conducted to determine new polarisation states which provide maximum fringe visibility and phase-matching, and the main controller controls the polarisation controllers in accordance with those new polarisation states.

19. The apparatus according to claim 14 wherein the main controller comprises a fringe visibility monitor, a Mach Zehnder output monitor, and a processor, the fringe visibility monitor for monitoring fringe visibilities of the fringes, the fringe visibility monitor having a circuit for determining a maximum or minimum value for each counter-propagating optical signal, and a circuit for determining the difference between the counter-propagating optical signals, the Mach Zehnder output monitor for determining receipt of the modified counter-propagating optical signals by detecting a change in the fringes caused by a perturbation, the fringe visibility monitor and the Mach Zehnder output monitor being connected to the detector, and the processor connected to the fringe visibility monitor and the Mach Zehnder output monitor, the processor for determining the location of the event, and for controlling a polarisation controller driver to in turn control the polarisation controllers to set the polarisation states of the counter-propagating optical signals.

20. The apparatus of claim 14 wherein the processor is for determining at least one pair of the stored polarisation states which provides the maximum fringe visibility.

21. A method of locating an event comprising the steps of:

launching light into a waveguide so that the light is caused to propagate in both directions along the waveguide to thereby provide counter-propagating optical signals in the waveguide, the waveguide being capable of having the counter-propagating optical signals or some characteristic of the signals modified or affected by an external parameter caused by the event, to provide modified counter-propagating optical signals which continue to propagate along the waveguide, wherein the wavelength of the light is continuously dithered at an electrical frequency outside the expected electrical frequency band caused by a detected perturbation;

the waveguide being formed as a Mach Zehnder interferometer having a first arm through which the counter-propagating optical signals travel, and a second arm through which the counter-propagating optical signals travel;

substantially continuously and simultaneously monitoring the modified counter-propagating optical signals, so that when an event occurs, both of the modified counter-propagating optical signals affected by the external parameter are detected;

determining the time difference between the detection of the modified signals in order to determine the location of the event; and controlling the polarisation states of the counter-propagating optical signals input into the waveguide to provide phase matched counter-propagating output signals from the waveguide by detecting fringe visibilities of fringes created by the counter-propagating optical signals when the signals travelling through the first and second arms recombine and interfere by determining maximum fringe visibilities and a minimum difference between the counter-propagating optical output signals corresponding to those maximum fringe visibilities, and continuously monitoring the fringe visibilities so that if the fringe visibilities drop below a predetermined value, new polarisation states are determined, and controlling the polarisation of the counter-propagating optical signals to provide phase matched counter-propagating optical output signals in accordance with the new polarisation states.

22. The method of claim 21 wherein the perturbation has a frequency in the bandwidth from 1 kHz to 20 kHz and the method further comprises band pass filtering outputs from the detectors to the bandwidth from 1 kHz to 20 kHz for perturbation detection and location of the perturbation.

23. The method according to claim 22 wherein the wavelength band of the dithered wavelength of the light is produced by a dithering frequency above 50 kHz.

24. The method according to claim 21 further comprising performing a global search to select a plurality of random input polarisation states randomly distributed over a Poincare sphere to determine the initial polarisation states to which the polarisation controllers are set for providing phase matched counter-propagating signals, and if fringe visibility drops below the predetermined value, conducting a localised search around the previously set polarisation states to determine new polarisation states which provide maximum fringe visibility and phase matching, and controlling the polarisation of the counter-propagating signals supplied to the Mach Zehnder interferometer in accordance with those new polarisation states.

25. The method according to claim 21 further comprising monitoring fringe visibilities of the fringes, determining a maximum or minimum value for each counter-propagating optical signal, determining the difference between the counter-propagating optical signals, and detecting the modified counter-propagating optical signals by detecting a change in the fringes caused by a perturbation.

26. The method of claim 21 wherein controlling the polarisation states comprises determining at least one pair of polarisation states that provides counter-propagating optical output signals which are amplitude and phase matched.

* * * * *